(12) United States Patent
Sun et al.

(10) Patent No.: US 12,216,336 B2
(45) Date of Patent: Feb. 4, 2025

(54) OPTICAL IMAGING LENS ASSEMBLY

(71) Applicant: ZHEJIANG SUNNY OPTICS CO., LTD., Zhejiang (CN)

(72) Inventors: Yeping Sun, Zhejiang (CN); Yang Li, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 493 days.

(21) Appl. No.: 17/583,144

(22) Filed: Jan. 24, 2022

(65) Prior Publication Data

US 2022/0244494 A1 Aug. 4, 2022

(30) Foreign Application Priority Data

Feb. 4, 2021 (CN) .......................... 202110153999.3

(51) Int. Cl.
*G02B 9/64* (2006.01)
*G02B 13/00* (2006.01)
(52) U.S. Cl.
CPC ........... *G02B 9/64* (2013.01); *G02B 13/0045* (2013.01)
(58) Field of Classification Search
CPC ............................. G02B 9/64; G02B 13/0045
See application file for complete search history.

(56) References Cited

U.S. PATENT DOCUMENTS

| | | | | |
|---|---|---|---|---|
| 2020/0012078 A1* | 1/2020 | Kuo | ................... | G02B 13/0045 |
| 2022/0066170 A1* | 3/2022 | Chae | ................... | G02B 13/0045 |
| 2022/0113501 A1* | 4/2022 | Liu | .......................... | G02B 9/64 |

FOREIGN PATENT DOCUMENTS

| | | | | |
|---|---|---|---|---|
| CN | 210626767 U | * | 5/2020 | ......... G02B 13/0045 |
| CN | 111596442 A | | 8/2020 | |
| CN | 111929838 A | | 11/2020 | |
| CN | 112014949 A | | 12/2020 | |
| CN | 112180566 A | | 1/2021 | |
| JP | 2015036778 A | | 2/2015 | |

OTHER PUBLICATIONS

Corresponding CN search results issued on Feb. 17, 2022.

* cited by examiner

*Primary Examiner* — Ephrem Z Mebrahtu
(74) *Attorney, Agent, or Firm* — Samson G. Yu

(57) ABSTRACT

The disclosure provides an optical imaging lens assembly, which sequentially includes, from an object side to an image side along an optical axis: a first lens with a negative refractive power, a second lens with a refractive power, a third lens with a refractive power, a fourth lens with a positive refractive power, a fifth lens with a refractive power, a sixth lens with a refractive power, a seventh lens with a positive refractive power, an eighth lens with a negative refractive power, and a ninth lens with a negative refractive power. ImgH is a half of a diagonal length of an effective pixel region on an imaging surface of the optical imaging lens assembly, ImgH and a total effective focal length f of the optical imaging lens assembly meet $1.2<ImgH/f<2.2$. There is a spacing distance between any two adjacent lenses in the first lens to the ninth lens.

19 Claims, 20 Drawing Sheets

Longitudinal aberration curve

Longitudinal aberration curve

Millimeter

Longitudinal aberration curve

Longitudinal aberration curve

OPTICAL IMAGING LENS ASSEMBLY

CROSS-REFERENCE TO RELATED APPLICATION(S)

The disclosure claims priority to Chinese Patent Application No. 202110153999.3, filed on Feb. 4, 2021 and entitled "Optical Imaging Lens Assembly", the contents of which are hereby incorporated by reference in its entirety.

TECHNICAL FIELD

The disclosure relates to the field of optical elements, and particularly to an optical imaging lens assembly.

BACKGROUND

With the rapid development of sciences and technologies, requirements of users on shooting functions of portable electronic products such as smart phones and requirements on the imaging quality of optical imaging lens assemblies in smart phones and the like have increased. Meanwhile, with the performance improvement and size reduction of photosensitive elements such as a Charge Coupled Device (CCD) or a Complementary Metal Oxide Semiconductors (CMOS), designing an optical imaging lens assembly with at least one of characteristics of large image surface, small size and the like to match such a photosensitive element has become a research and development direction of lens designers.

SUMMARY

An embodiment of the disclosure provides an optical imaging lens assembly, which sequentially includes, from an object side to an image side along an optical axis: a first lens with a negative refractive power, a second lens with a refractive power, a third lens with a refractive power, a fourth lens with a positive refractive power, a fifth lens with a refractive power, a sixth lens with a refractive power, a seventh lens with a positive refractive power, an eighth lens with a negative refractive power, and a ninth lens with a negative refractive power. ImgH is a half of a diagonal length of an effective pixel region on an imaging surface of the optical imaging lens assembly, ImgH and a total effective focal length f of the optical imaging lens assembly may meet $1.2<ImgH/f<2.2$. There is a spacing distance between any two adjacent lenses in the first lens to the ninth lens.

In an implementation mode, at least one mirror surface in an object-side surface of the first lens to an image-side surface of the ninth lens is an aspheric mirror surface.

In an implementation mode, an effective focal length f1 of the first lens and an effective focal length f9 of the ninth lens may meet $2.2<f1/f9<2.7$.

In an implementation mode, an effective focal length f3 of the third lens, an effective focal length f4 of the fourth lens and an effective focal length f7 of the seventh lens may meet $1.2<f3/(f4+f7)<2.1$.

In an implementation mode, a curvature radius R2 of an image-side surface of the first lens, a curvature radius R3 of an object-side surface of the second lens and a curvature radius R4 of an image-side surface of the second lens may meet $1.0<R2/(R3+R4)<1.5$.

In an implementation mode, a curvature radius R11 of an object-side surface of the sixth lens and a curvature radius R12 of an image-side surface of the sixth lens may meet $0.7<R11/R12<2.7$.

In an implementation mode, a curvature radius R17 of an object-side surface of the ninth lens, a curvature radius R18 of an image-side surface of the ninth lens, a curvature radius R13 of an object-side surface of the seventh lens and a curvature radius R14 of an image-side surface of the seventh lens may meet $3.0<(R17-R18)/(R13+R14)<6.0$.

In an implementation mode, a curvature radius R15 of an object-side surface of the eighth lens and a curvature radius R16 of an image-side surface of the eighth lens may meet $1.0<R15/R16<1.5$.

In an implementation mode, a spacing distance T78 of the seventh lens and the eighth lens on the optical axis, a spacing distance T89 of the eighth lens and the ninth lens on the optical axis and a spacing distance T23 of the second lens and the third lens on the optical axis may meet $1.0<(T78+T89)/T23<1.5$.

In an implementation mode, an effective radius DT11 of an object-side surface of the first lens, an effective radius DT31 of an object-side surface of the third lens and an effective radius DT32 of an image-side surface of the third lens may meet $1.2<DT11/(DT31+DT32)<1.7$.

In an implementation mode, an effective radius DT92 of an image-side surface of the ninth lens, an effective radius DT31 of an object-side surface of the third lens and an effective radius DT32 of an image-side surface of the third lens may meet $1.8<DT92/(DT31+DT32)<2.3$.

In an implementation mode, a combined focal length f56 of the fifth lens and the sixth lens, a combined focal length f12 of the first lens and the second lens and a combined focal length f89 of the eighth lens and the ninth lens may meet $0.8<f56/(f12+f89)<2.9$.

In an implementation mode, a combined focal length f34 of the third lens and the fourth lens, a center thickness CT3 of the third lens on the optical axis and a center thickness CT4 of the fourth lens on the optical axis may meet $3.5<f34/(CT3+CT4)<4.5$.

In an implementation mode, a center thickness CT7 of the seventh lens on the optical axis and an edge thickness ET7 of the seventh lens may meet $3.3<CT7/ET7<4.4$.

In an implementation mode, an edge thickness ET4 of the fourth lens, an edge thickness ET8 of the eighth lens and an edge thickness ET9 of the ninth lens may meet $1.0<(ET4+ET8)/ET9<1.5$.

In an implementation mode, at least three of the first lens to the ninth lens are plastic lenses.

Another aspect of the disclosure provides an optical imaging lens assembly, which sequentially includes, from an object side to an image side along an optical axis: a first lens with a negative refractive power, a second lens with a refractive power, a third lens with a refractive power, a fourth lens with a positive refractive power, a fifth lens with a refractive power, a sixth lens with a refractive power, a seventh lens with a positive refractive power, an eighth lens with a negative refractive power, and a ninth lens with a negative refractive power. An effective focal length f3 of the third lens, an effective focal length f4 of the fourth lens and an effective focal length f7 of the seventh lens may meet $1.2<f3/(f4+f7)<2.1$. There is a spacing distance between any two adjacent lenses in the first lens and the ninth lens.

In an implementation mode, an effective focal length f1 of the first lens and an effective focal length f9 of the ninth lens may meet $2.2<f1/f9<2.7$.

In an implementation mode, a curvature radius R2 of an image-side surface of the first lens, a curvature radius R3 of an object-side surface of the second lens and a curvature radius R4 of an image-side surface of the second lens may meet $1.0<R2/(R3+R4)<1.5$.

In an implementation mode, a curvature radius R11 of an object-side surface of the sixth lens and a curvature radius R12 of an image-side surface of the sixth lens may meet $0.7<R11/R12<2.7$.

In an implementation mode, a curvature radius R17 of an object-side surface of the ninth lens, a curvature radius R18 of an image-side surface of the ninth lens, a curvature radius R13 of an object-side surface of the seventh lens and a curvature radius R14 of an image-side surface of the seventh lens may meet $3.0<(R17-R18)/(R13+R14)<6.0$.

In an implementation mode, a curvature radius R15 of an object-side surface of the eighth lens and a curvature radius R16 of an image-side surface of the eighth lens may meet $1.0<R15/R16<1.5$.

In an implementation mode, a spacing distance T78 of the seventh lens and the eighth lens on the optical axis, a spacing distance T89 of the eighth lens and the ninth lens on the optical axis and a spacing distance T23 of the second lens and the third lens on the optical axis may meet $1.0<(T78+T89)/T23<1.5$.

In an implementation mode, an effective radius DT11 of an object-side surface of the first lens, an effective radius DT31 of an object-side surface of the third lens and an effective radius DT32 of an image-side surface of the third lens may meet $1.2<DT11/(DT31+DT32)<1.7$.

In an implementation mode, an effective radius DT92 of an image-side surface of the ninth lens, an effective radius DT31 of an object-side surface of the third lens and an effective radius DT32 of an image-side surface of the third lens may meet $1.8<DT92/(DT31+DT32)<2.3$.

In an implementation mode, a combined focal length f56 of the fifth lens and the sixth lens, a combined focal length f12 of the first lens and the second lens and a combined focal length f89 of the eighth lens and the ninth lens may meet $0.8<f56/(f12+f89)<2.9$.

In an implementation mode, a combined focal length f34 of the third lens and the fourth lens, a center thickness CT3 of the third lens on the optical axis and a center thickness CT4 of the fourth lens on the optical axis may meet $3.5<f34/(CT3+CT4)<4.5$.

In an implementation mode, a center thickness CT7 of the seventh lens on the optical axis and an edge thickness ET7 of the seventh lens may meet $3.3<CT7/ET7<4.4$.

In an implementation mode, an edge thickness ET4 of the fourth lens, an edge thickness ET8 of the eighth lens and an edge thickness ET9 of the ninth lens may meet $1.0<(ET4+ET8)/ET9<1.5$.

In an implementation mode, at least three of the first lens to the ninth lens are plastic lenses.

In an implementation mode, TTL is a distance from an object-side surface of the first lens to an imaging surface of the optical imaging lens assembly on the optical axis, and TTL may meet $TTL<10$ mm.

In an implementation mode, ImgH is a half of a diagonal length of an effective pixel region on an imaging surface of the optical imaging lens assembly, ImgH and a total effective focal length f of the optical imaging lens assembly may meet $1.2<ImgH/f<2.2$.

According to the disclosure, the refractive power is configured reasonably, and optical parameters are optimized, so that the provided optical imaging lens assembly is applicable to a portable electronic product, and has at least one of beneficial effects of large image surface, large aperture, small size, high imaging quality, etc.

BRIEF DESCRIPTION OF THE DRAWINGS

The other features, objectives and advantages of the disclosure become more apparent upon reading detailed descriptions made to unrestrictive implementation modes with reference to the following drawings.

DETAILED DESCRIPTION OF THE EMBODIMENTS

Figure 1:
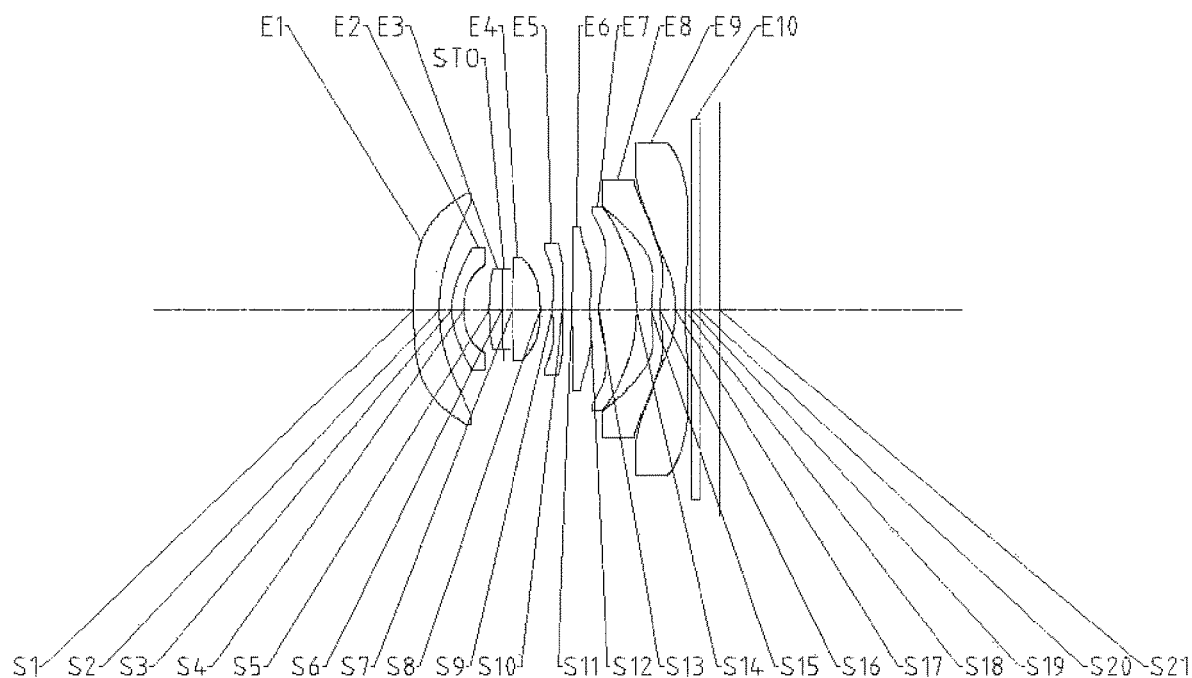
FIG. 1 shows a structure diagram of an optical imaging lens assembly according to embodiment 1 of the disclosure.

In order to understand the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, and the like are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain", and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging lens assembly according to an exemplary implementation mode of the disclosure may include nine lenses with refractive power, i.e., a first lens, a second lens, a third lens, a fourth lens, a fifth lens, a sixth lens, a seventh lens, an eighth lens, and a ninth lens respectively. The nine lenses are sequentially arranged from an object side to an image side along an optical axis.

In an exemplary implementation mode, there may be a spacing distance between any two adjacent lenses in the first lens to the ninth lens, so as to ensure the overall machinability of the lens assembly and improve the manufacturability of the lens assembly.

In an exemplary implementation mode, the first lens may have a negative refractive power. The second lens may have a positive refractive power or a negative refractive power. The third lens may have a positive refractive power or a negative refractive power. The fourth lens may have a positive refractive power. The fifth lens may have a positive refractive power or a negative refractive power. The sixth lens may have a positive refractive power or a negative refractive power. The seventh lens may have a positive refractive power. The eighth lens may have a negative refractive power. The ninth lens may have a negative refractive power. The refractive power and surface type features of the first lens to the ninth lens are configured reasonably, so that a low-order aberration of the optical imaging lens assembly may be balanced effectively.

In an exemplary implementation mode, the optical imaging lens assembly according to the disclosure may meet $1.2<\text{ImgH}/f<2.2$, wherein ImgH is a half of a diagonal length of an effective pixel region on an imaging surface of the optical imaging lens assembly, and f is a total effective focal length of the optical imaging lens assembly. More specifically, ImgH and f may further meet $1.6<\text{ImgH}/f<1.8$. $1.2<\text{ImgH}/f<2.2$ is met, so that the characteristics of large image surface, large aperture and the like may be achieved.

In an exemplary implementation mode, the optical imaging lens assembly according to the disclosure may meet $2.2<f1/f9<2.7$, wherein f1 is an effective focal length of the first lens, and f9 is an effective focal length of the ninth lens. More specifically, f1 and f9 may further meet $2.2<f1/f9<2.6$. $2.2<f1/f9<2.7$ is met, so that a deflection angle of light may be reduced, and the imaging quality of the optical imaging lens assembly may be improved.

In an exemplary implementation mode, the optical imaging lens assembly according to the disclosure may meet $1.2<f3/(f4+f7)<2.1$, wherein f3 is an effective focal length of the third lens, f4 is an effective focal length of the fourth lens, and f7 is an effective focal length of the seventh lens. More specifically, f3, f4 and f7 may further meet $1.3<f3/(f4+f7)<2.0$. $1.2<f3/(f4+f7)<2.1$ is met, so that contributions of the third lens, the fourth lens and the seventh lens to an overall aberration of the optical imaging lens assembly may be controlled, an off-axis aberration of the optical imaging lens assembly may be balanced, and the imaging quality of the optical imaging lens assembly may be improved.

In an exemplary implementation mode, the optical imaging lens assembly according to the disclosure may meet $1.0<R2/(R3+R4)<1.5$, wherein R2 is a curvature radius of an image-side surface of the first lens, R3 is a curvature radius of an object-side surface of the second lens, and R4 is a curvature radius of an image-side surface of the second lens. More specifically, R2, R3 and R4 may further meet $1.1<R2/(R3+R4)<1.4$. $1.0<R2/(R3+R4)<1.5$ is met, so that aberrations generated by the first lens and the second lens may be controlled effectively.

In an exemplary implementation mode, the optical imaging lens assembly according to the disclosure may meet $0.7<R11/R12<2.7$, wherein R11 is a curvature radius of an object-side surface of the sixth lens, and R12 is a curvature radius of an image-side surface of the sixth lens. More specifically, R11 and R12 may further meet $0.8<R11/R12<2.7$. $0.7<R11/R12<2.7$ is met, so that a deflection angle of light may be reduced, and the lens assembly may deflect a light path relatively well.

In an exemplary implementation mode, the optical imaging lens assembly according to the disclosure may meet $3.0<(R17-R18)/(R13+R14)<6.0$, wherein R17 is a curvature radius of an object-side surface of the ninth lens, R18 is a curvature radius of an image-side surface of the ninth lens, R13 is a curvature radius of an object-side surface of the seventh lens, and R14 is a curvature radius of an image-side surface of the seventh lens. More specifically, R17, R18, R13 and R14 may further meet $3.1<(R17-R18)/(R13+R14)<6.0$. $3.0<(R17-R18)/(R13+R14)<6.0$ is met, so that a deflection angle of light in the lens assembly may be controlled reasonably, and the sensitivity of the lens assembly may be reduced effectively.

In an exemplary implementation mode, the optical imaging lens assembly according to the disclosure may meet $1.0<R15/R16<1.5$, wherein R15 is a curvature radius of an object-side surface of the eighth lens, and R16 is a curvature radius of an image-side surface of the eighth lens. More specifically, R15 and R16 may further meet $1.0<R15/R16<1.3$. $1.0<R15/R16<1.5$ is met, so that light in a marginal field of view may be controlled in a reasonable range, and the sensitivity of the lens assembly may be reduced effectively.

In an exemplary implementation mode, the optical imaging lens assembly according to the disclosure may meet $1.0<(T78+T89)/T23<1.5$, wherein T78 is a spacing distance of the seventh lens and the eighth lens on the optical axis, T89 is a spacing distance of the eighth lens and the ninth lens on the optical axis, and T23 is a spacing distance of the second lens and the third lens on the optical axis. More specifically, T78, T89 and T23 may further meet $1.1<(T78+T89)/T23<1.4$. $1.0<(T78+T89)/T23<1.5$ is met, so that field curvatures generated by a front-end lens and back-end lens of the optical imaging lens assembly may be balanced to help to make a field curvature of the optical imaging lens assembly more reasonable.

In an exemplary implementation mode, the optical imaging lens assembly according to the disclosure may meet $1.2<DT11/(DT31+DT32)<1.7$, wherein DT11 is an effective radius of an object-side surface of the first lens, DT31 is an effective radius of an object-side surface of the third lens, and DT32 is an effective radius of an image-side surface of the third lens. More specifically, DT11, DT31 and DT32 may further meet $1.3<DT11/(DT31+DT32)<1.7$. Meeting $1.2<DT11/(DT31+DT32)<1.7$ is favorable for reducing the front-end size of the lens assembly to achieve the characteristic of small weight and thickness, and is also favorable for reasonably restricting the propagation direction of incident light, eliminating marginal light with relatively poor quality, reducing an off-axis aberration and effectively improving the resolving power of the lens assembly.

In an exemplary implementation mode, the optical imaging lens assembly according to the disclosure may meet $1.8<DT92/(DT31+DT32)<2.3$, wherein DT92 is an effective radius of an image-side surface of the ninth lens, DT31 is an effective radius of an object-side surface of the third lens, and DT32 is an effective radius of an image-side surface of the third lens. More specifically, DT92, DT31 and DT32 may further meet $2.0<DT92/(DT31+DT32)<2.2$. Meeting $1.8<DT92/(DT31+DT32)<2.3$ is favorable for reasonably controlling the size of the lens assembly to miniaturize the lens assembly, and is also favorable for reasonably restricting the propagation direction of incident light and reducing an aberration of the lens assembly.

In an exemplary implementation mode, the optical imaging lens assembly according to the disclosure may meet $0.8<f56/(f12+f89)<2.9$, wherein f56 is a combined focal length of the fifth lens and the sixth lens, f12 is a combined focal length of the first lens and the second lens, and f89 is a combined focal length of the eighth lens and the ninth lens. More specifically, f56, f12 and f89 may further meet $0.9<f56/(f12+f89)<2.9$. $0.8<f56/(f12+f89)<2.9$ is met, so that contributions of the above-mentioned lenses to an overall aberration of the optical imaging lens assembly may be controlled reasonably to help to balance an off-axis aberration of the lens assembly and further improve the imaging quality of the lens assembly.

In an exemplary implementation mode, the optical imaging lens assembly according to the disclosure may meet $3.5<f34/(CT3+CT4)<4.5$, wherein f34 is a combined focal length of the third lens and the fourth lens, CT3 is a center thickness of the third lens on the optical axis, and CT4 is a center thickness of the fourth lens on the optical axis. More specifically, f34, CT3 and CT4 may further meet $3.7<f34/(CT3+CT4)<4.3$. $3.5<f34/(CT3+CT4)<4.5$ is met, so that the machinability of the third lens and the fourth lens and spherical aberration contributions of the third lens and the fourth lens may be controlled reasonably to achieve high imaging quality in a longitudinal field of view of the lens assembly.

In an exemplary implementation mode, the optical imaging lens assembly according to the disclosure may meet $3.3<CT7/ET7<4.4$, wherein CT7 is a center thickness of the seventh lens on the optical axis, and ET7 is an edge thickness of the seventh lens. More specifically, CT7 and ET7 may further meet $3.4<CT7/ET7<4.4$. $3.3<CT7/ET7<4.4$ is met, so that high machinability of the seventh lens may be ensured.

In an exemplary implementation mode, the optical imaging lens assembly according to the disclosure may meet $1.0<(ET4+ET8)/ET9<1.5$, wherein ET4 is an edge thickness of the fourth lens, ET8 is an edge thickness of the eighth lens, and ET9 is an edge thickness of the ninth lens. $1.0<(ET4+ET8)/ET9<1.5$ is met, so that field curvature contributions of the fourth lens, the eighth lens and the ninth lens may be controlled in a reasonable range to help to balance field curvatures generated by the other lenses.

In an exemplary implementation mode, the optical imaging lens assembly according to the disclosure may meet $TTL<10$ mm, wherein TTL is a distance from an object-side surface of the first lens to an imaging surface of the optical imaging lens assembly on the optical axis. More specifically, TTL may further meet $TTL<9$ mm. Meeting $TTL<10$ mm is favorable for miniaturizing the lens assembly.

In an exemplary implementation mode, at least three of the first lens to the ninth lens may be plastic lenses. The use of plastic lenses ensures the ease of machining, may also achieve the characteristic of small weight and thickness of the lens assembly, and is also favorable for reducing the manufacturing cost and the production cost, etc.

In an exemplary implementation mode, the optical imaging lens assembly according to the disclosure further includes a diaphragm arranged between the third lens and the fourth lens. Optionally, the optical imaging lens assembly may further include an optical filter configured to correct the chromatic aberration and/or protective glass configured to protect a photosensitive element on the imaging surface. The disclosure discloses an optical imaging lens assembly with the characteristics of small size, large image surface, large aperture, high imaging quality, etc. The optical imaging lens assembly according to the implementation mode of the disclosure may adopt multiple lenses, for example, the above-mentioned nine. The refractive power and surface types of each lens, the center thickness of each lens, on-axis distances between the lenses and the like may be reasonably configured to effectively converge incident light, reduce a total track length of the imaging lens assembly, improve the machinability of the imaging lens assembly and ensure that the optical imaging lens assembly is more favorable for production and machining.

In the implementation mode of the disclosure, at least one of mirror surfaces of each lens is an aspheric mirror surface. That is, at least one mirror surface in an object-side surface of the first lens to an image-side surface of the ninth lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With the adoption of the aspheric lens, astigmatic aberrations during imaging may be eliminated as much as possible, thereby improving the imaging quality. Optionally, at least one of the object-side surface and image-side surface of each lens in the first lens, the second lens, the third lens, the fourth lens, the fifth lens, the sixth lens, the seventh lens, the eighth lens and the ninth lens is an aspheric mirror surface. Optionally, both the object-side surface and image-side surface of each lens in the first lens, the second lens, the third lens, the fourth lens, the fifth lens, the sixth lens, the seventh lens, the eighth lens and the ninth lens are aspheric mirror surfaces.

However, those skilled in the art should know that the number of the lenses forming the optical imaging lens assembly may be changed without departing from the technical solutions claimed in the disclosure to achieve each result and advantage described in the specification. For example, although descriptions are made in the implementation with nine lenses as an example, the optical imaging lens assembly is not limited to nine lenses. If necessary, the optical imaging lens assembly may further include another number of lenses.

Specific embodiments applied to the optical imaging lens assembly of the above-mentioned implementation mode will further be described below with reference to the drawings.

Embodiment 1

An optical imaging lens assembly according to embodiment 1 of the disclosure will be described below with reference to FIGS. 1 to 2D. FIG. 1 shows a structure diagram of an optical imaging lens assembly according to embodiment 1 of the disclosure.

As shown in FIG. 1, the optical imaging lens assembly sequentially includes, from an object side to an image side, a first lens E1, a second lens E2, a third lens E3, a diaphragm STO, a fourth lens E4, a fifth lens E5, a sixth lens E6, a seventh lens E7, an eighth lens E8, a ninth lens E9, an optical filter E10, and an imaging surface S21.

The first lens E1 has a negative refractive power, an object-side surface S1 thereof is a concave surface, while an image-side surface S2 is a concave surface. The second lens E2 has a positive refractive power, an object-side surface S3 thereof is a convex surface, while an image-side surface S4 is a concave surface. The third lens E3 has a positive refractive power, an object-side surface S5 thereof is a convex surface, while an image-side surface S6 is a convex surface. The fourth lens E4 has a positive refractive power, an object-side surface S7 thereof is a convex surface, while an image-side surface S8 is a convex surface. The fifth lens E5 has a positive refractive power, an object-side surface S9 thereof is a convex surface, while an image-side surface S10 is a concave surface. The sixth lens E6 has a negative refractive power, an object-side surface S11 thereof is a convex surface, while an image-side surface S12 is a concave surface. The seventh lens E7 has a positive refractive power, an object-side surface S13 thereof is a convex surface, while an image-side surface S14 is a convex surface. The eighth lens E8 has a negative refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

Table 1 shows a basic parameter table of the optical imaging lens assembly of embodiment 1, and units of the curvature radius, the thickness/distance and the focal length are all millimeter (mm).

TABLE 1

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| S1 | Aspheric | −584.1554 | 0.6985 | 1.57 | 37.3 | −8.31 | 0.0000 |
| S2 | Aspheric | 4.7829 | 0.3303 | | | | 0.0000 |
| S3 | Aspheric | 1.9763 | 0.3239 | 1.67 | 19.2 | 690.08 | 0.0000 |
| S4 | Aspheric | 1.8533 | 0.6957 | | | | 0.0000 |
| S5 | Aspheric | 8.1478 | 0.3382 | 1.54 | 56.1 | 14.39 | 0.0000 |
| S6 | Aspheric | −217.7864 | 0.0603 | | | | 0.0000 |
| STO | Spherical | Infinite | 0.2234 | | | | |
| S7 | Aspheric | 17.7423 | 0.7560 | 1.54 | 56.1 | 5.88 | 0.0000 |
| S8 | Aspheric | −3.8578 | 0.3315 | | | | 0.0000 |
| S9 | Aspheric | 7.7974 | 0.2817 | 1.67 | 19.2 | 188.48 | 0.0000 |
| S10 | Aspheric | 8.1832 | 0.2456 | | | | 0.0000 |
| S11 | Aspheric | 7.2128 | 0.5049 | 1.54 | 56.1 | −15.54 | 0.0000 |
| S12 | Aspheric | 3.8016 | 0.2391 | | | | 0.0000 |
| S13 | Aspheric | 2.3701 | 1.0181 | 1.54 | 56.1 | 2.91 | −1.2994 |
| S14 | Aspheric | −4.0713 | 0.3972 | | | | 0.0000 |
| S15 | Aspheric | 2.9077 | 0.2500 | 1.67 | 19.2 | −24.40 | −0.6309 |
| S16 | Aspheric | 2.3869 | 0.4083 | | | | −0.9708 |
| S17 | Aspheric | −3.7069 | 0.2500 | 1.67 | 19.2 | −3.41 | −1.0662 |
| S18 | Aspheric | 6.3125 | 0.1973 | | | | 0.0000 |
| S19 | Spherical | Infinite | 0.2100 | 1.52 | 64.2 | | |

TABLE 1-continued

| Surface number | Surface type | Curvature radius | Thickness/ distance | Refractive index | Abbe number | Focal length | Conic coefficient |
|---|---|---|---|---|---|---|---|
| S20 | Spherical | Infinite | 0.5400 | | | | |
| S21 | Spherical | Infinite | | | | | |

In the example, a total effective focal length f of the optical imaging lens assembly is 3.31 mm. TTL is a total length of the optical imaging lens assembly (i.e., a distance from the object-side surface S1 of the first lens E1 to the imaging surface S21 of the optical imaging lens assembly on an optical axis), and TTL is 8.30 mm. ImgH is a half of a diagonal length of an effective pixel region on the imaging surface S21 of the optical imaging lens assembly, and ImgH is 5.59 mm. FOV is a maximum field of view of the optical imaging lens assembly, and FOV is 119.9°.

In embodiment 1, both the object-side surface and image-side surface of any lens in the first lens E1 to the ninth lens E9 are aspheric surfaces. A surface type x of each aspheric lens may be defined through, but not limited to, the following aspheric surface formula:

$$x = \frac{ch^2}{1 + \sqrt{1-(k+1)c^2h^2}} + \sum A_i h^i, \quad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1); k is a conic coefficient; and Ai is a correction coefficient of the i-th order of the aspheric surface. Table 2 shows high-order coefficients $A_4$, $A_6$, $A_8$, $A_{10}$, $A_{12}$, $A_{14}$ and $A_{16}$ that can be used for the aspheric mirror surfaces S1-S18 in embodiment 1.

Figure 2A:
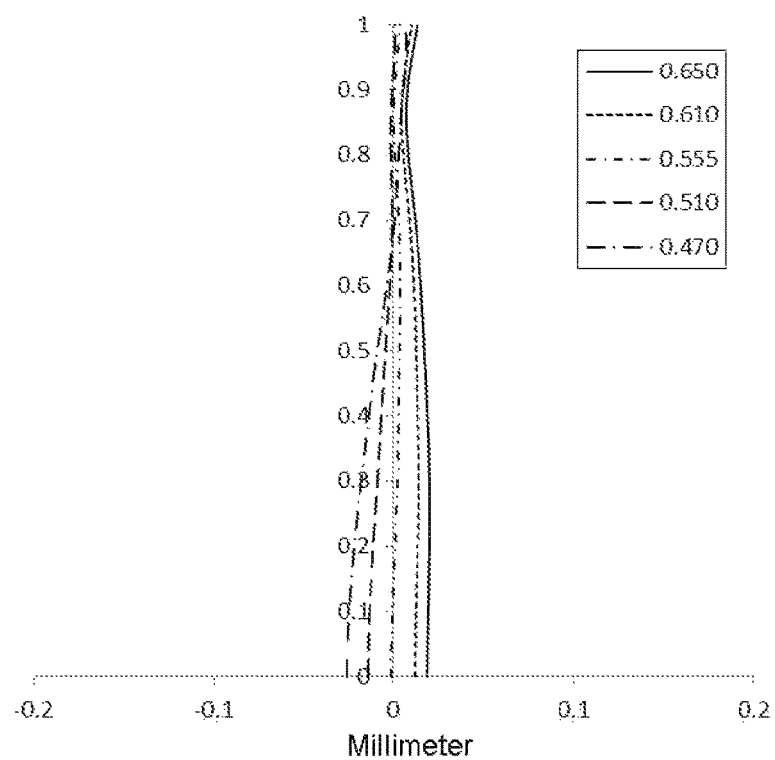
FIGS. 2A to 2D show a longitudinal aberration curve, an astigmatism curve, a distortion curve and a lateral color curve of an optical imaging lens assembly according to embodiment 1 respectively.
Figure 2B:
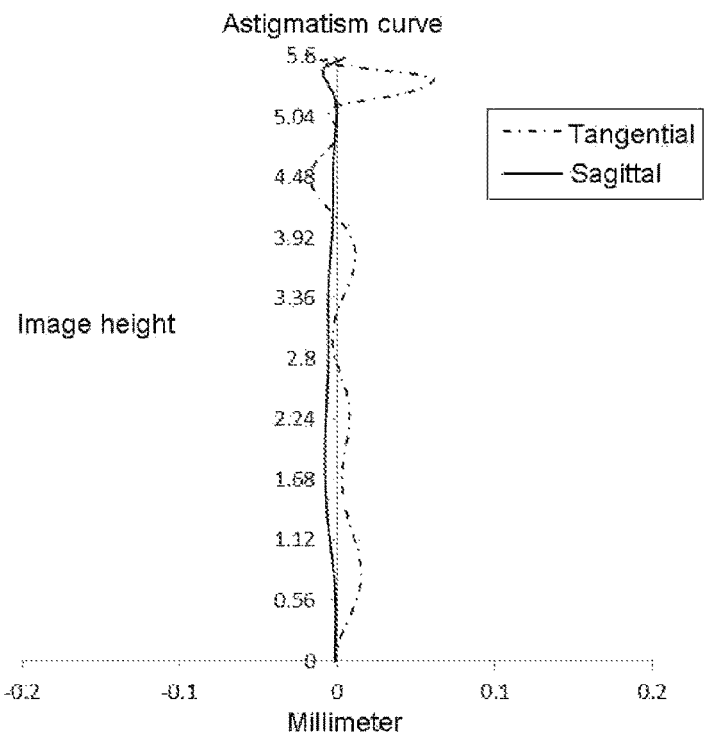
Figure 2C:
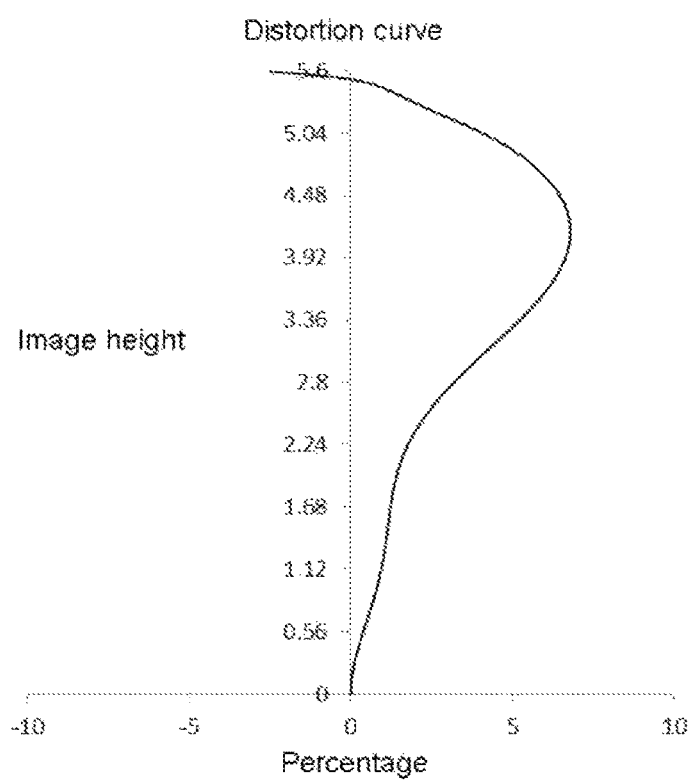
Figure 2D:
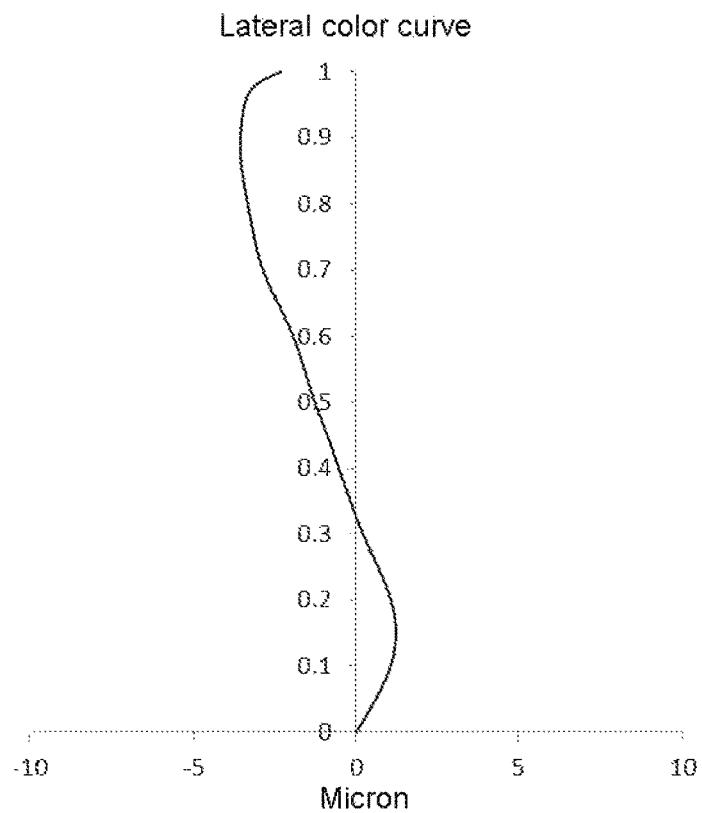

FIG. 2A shows a longitudinal aberration curve of the optical imaging lens assembly according to embodiment 1 to represent deviations of a convergence focal point after light with different wavelengths passes through the lens assembly. FIG. 2B shows an astigmatism curve of the optical imaging lens assembly according to embodiment 1 to represent a tangential image surface curvature and a sagittal image surface curvature. FIG. 2C shows a distortion curve of the optical imaging lens assembly according to embodiment 1 to represent distortion values corresponding to different image heights. FIG. 2D shows a lateral color curve of the optical imaging lens assembly according to embodiment 1 to represent deviations of different image heights on the imaging surface after the light passes through the lens assembly. According to FIGS. 2A to 2D, it can be seen that the optical imaging lens assembly provided in embodiment 1 may achieve high imaging quality.

Embodiment 2

Figure 3:
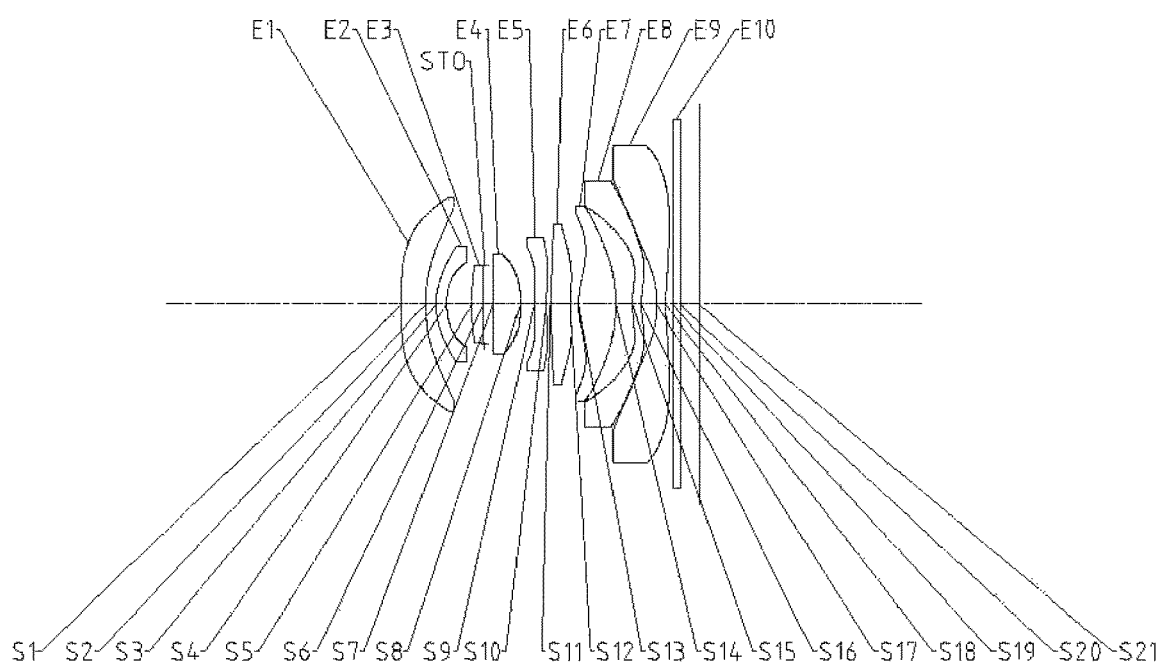
FIG. 3 shows a structure diagram of an optical imaging lens assembly according to embodiment 2 of the disclosure.

An optical imaging lens assembly according to embodiment 2 of the disclosure will be described below with reference to FIGS. 3 to 4D. In the embodiment and the following embodiments, part of descriptions similar to those about embodiment 1 are omitted for simplicity. FIG. 3 shows a structure diagram of an optical imaging lens assembly according to embodiment 2 of the disclosure.

As shown in FIG. 3, the optical imaging lens assembly sequentially includes, from an object side to an image side, a first lens E1, a second lens E2, a third lens E3, a diaphragm STO, a fourth lens E4, a fifth lens E5, a sixth lens E6, a seventh lens E7, an eighth lens E8, a ninth lens E9, an optical filter E10, and an imaging surface S21.

The first lens E1 has a negative refractive power, an object-side surface S1 thereof is a convex surface, while an image-side surface S2 is a concave surface. The second lens

TABLE 2

| Surface number | A4 | A6 | A8 | A10 | A12 | A14 | A16 |
|---|---|---|---|---|---|---|---|
| S1  | 3.3838E−02  | −8.5726E−03 | 2.1716E−03  | −3.7860E−04 | 4.2473E−05  | −2.6652E−06 | 6.9977E−08 |
| S2  | 7.4091E−03  | −3.6167E−03 | 1.2791E−03  | −3.2074E−04 | 4.3776E−05  | −2.9907E−06 | 8.1030E−08 |
| S3  | −4.7537E−02 | 7.3151E−03  | −5.4598E−04 | 2.5884E−03  | −3.0797E−03 | 9.9046E−04  | −1.0585E−04 |
| S4  | 4.5077E−03  | 5.8786E−02  | −1.0862E−01 | 2.1299E−01  | −2.0750E−01 | 1.0737E−01  | −2.1940E−02 |
| S5  | 8.1581E−03  | 1.9211E−02  | −3.8707E−02 | 6.9820E−02  | −7.2229E−02 | 4.0884E−02  | −1.0379E−02 |
| S6  | 6.5393E−03  | −1.1438E−02 | 5.1073E−02  | −8.9984E−02 | 8.8087E−02  | −4.2499E−02 | 7.5393E−03 |
| S7  | −2.3934E−03 | −3.4968E−03 | −2.9871E−03 | 6.0915E−03  | −7.1649E−03 | 3.8503E−03  | −7.0889E−04 |
| S8  | −5.8725E−02 | −1.3115E−02 | 2.8516E−02  | −3.3107E−02 | 2.1353E−02  | −7.6888E−03 | 1.2094E−03 |
| S9  | −4.9825E−02 | −4.2545E−02 | 3.3522E−02  | −1.2420E−02 | 1.4440E−03  | 6.5978E−04  | −1.6630E−04 |
| S10 | −2.7175E−02 | −3.8435E−02 | 3.4123E−02  | −1.4241E−02 | 3.0921E−03  | −2.3791E−04 | −7.7098E−06 |
| S11 | −7.3163E−02 | 4.0831E−02  | −1.2198E−02 | 1.7051E−03  | −5.9731E−06 | −2.7565E−05 | 2.4044E−06 |
| S12 | −1.6273E−01 | 6.0014E−02  | −1.1692E−02 | −1.0685E−04 | 6.6093E−04  | −1.3693E−04 | 9.1466E−06 |
| S13 | −6.3018E−02 | −3.2888E−04 | 5.0678E−03  | −1.8878E−03 | 3.3903E−04  | −3.0153E−05 | 1.0635E−06 |
| S14 | 4.1424E−02  | −3.4266E−02 | 1.2020E−02  | −1.8778E−03 | 9.3331E−05  | 6.0500E−06  | −5.8819E−07 |
| S15 | −1.3992E−01 | 2.7905E−02  | 1.2402E−02  | −4.0454E−03 | 6.0670E−04  | −4.6269E−05 | 1.4508E−06 |
| S16 | −1.7440E−01 | 5.1992E−02  | −8.9080E−03 | 9.0985E−04  | −5.4453E−05 | 1.7612E−06  | −2.3692E−08 |
| S17 | −5.0691E−02 | 2.7560E−02  | −5.8395E−03 | 6.4376E−04  | −3.8182E−05 | 1.1359E−06  | −1.2930E−08 |
| S18 | −3.3414E−02 | 8.1060E−03  | −1.1790E−03 | 1.0088E−04  | −5.1285E−06 | 1.4448E−07  | −1.7455E−09 |

E2 has a positive refractive power, an object-side surface S3 thereof is a convex surface, while an image-side surface S4 is a concave surface. The third lens E3 has a positive refractive power, an object-side surface S5 thereof is a convex surface, while an image-side surface S6 is a convex surface. The fourth lens E4 has a positive refractive power, an object-side surface S7 thereof is a convex surface, while an image-side surface S8 is a convex surface. The fifth lens E5 has a negative refractive power, an object-side surface S9 thereof is a convex surface, while an image-side surface S10 is a concave surface. The sixth lens E6 has a negative refractive power, an object-side surface S11 thereof is a convex surface, while an image-side surface S12 is a concave surface. The seventh lens E7 has a positive refractive power, an object-side surface S13 thereof is a convex surface, while an image-side surface S14 is a convex surface. The eighth lens E8 has a negative refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20.

Light from an object sequentially penetrates through each of the surfaces S1 to S20 and is finally imaged on the imaging surface S21.

In the example, a total effective focal length f of the optical imaging lens assembly is 3.32 mm. TTL is a total length of the optical imaging lens assembly, and TTL is 8.30 mm. ImgH is a half of a diagonal length of an effective pixel region on the imaging surface S21 of the optical imaging lens assembly, and ImgH is 5.59 mm. FOV is a maximum field of view of the optical imaging lens assembly, and FOV is 120.0°.

Table 3 shows a basic parameter table of the optical imaging lens assembly of embodiment 2, and units of the curvature radius, the thickness/distance and the focal length are all millimeter (mm). Table 4 shows high-order coefficients that can be used for each aspheric mirror surface in embodiment 2. A surface type of each aspheric surface may be defined by the formula (1) given in embodiment 1.

TABLE 3

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | 380.5504 | 0.6663 | 1.57 | 37.3 | −8.12 | 0.0000 |
| S2 | Aspheric | 4.5741 | 0.2928 | | | | 0.0000 |
| S3 | Aspheric | 1.9529 | 0.2932 | 1.67 | 19.2 | 236.31 | 0.0000 |
| S4 | Aspheric | 1.8572 | 0.7086 | | | | 0.0000 |
| S5 | Aspheric | 8.6270 | 0.3247 | 1.54 | 56.1 | 15.50 | 0.0000 |
| S6 | Aspheric | −436.2334 | 0.0419 | | | | 0.0000 |
| STO | Spherical | Infinite | 0.2342 | | | | |
| S7 | Aspheric | 18.7141 | 0.7543 | 1.54 | 56.1 | 5.81 | 0.0000 |
| S8 | Aspheric | −3.7670 | 0.3836 | | | | 0.0000 |
| S9 | Aspheric | 8.8904 | 0.3376 | 1.67 | 19.2 | −31.15 | 0.0000 |
| S10 | Aspheric | 6.1598 | 0.1174 | | | | 0.0000 |
| S11 | Aspheric | 5.7772 | 0.5410 | 1.54 | 56.1 | −25.23 | 0.0000 |
| S12 | Aspheric | 3.9354 | 0.2308 | | | | 0.0000 |
| S13 | Aspheric | 2.3673 | 1.0306 | 1.54 | 56.1 | 2.92 | −1.1868 |
| S14 | Aspheric | −4.1285 | 0.4672 | | | | 0.0000 |
| S15 | Aspheric | 2.8075 | 0.2500 | 1.67 | 19.2 | −52.55 | −0.8831 |
| S16 | Aspheric | 2.5088 | 0.4330 | | | | −1.0181 |
| S17 | Aspheric | −3.5536 | 0.2500 | 1.67 | 19.2 | −3.36 | −0.9373 |
| S18 | Aspheric | 6.5051 | 0.1930 | | | | 0.0000 |
| S19 | Spherical | Infinite | 0.2100 | 1.52 | 64.2 | | |
| S20 | Spherical | Infinite | 0.5400 | | | | |
| S21 | Spherical | Infinite | | | | | |

TABLE 4

| Surface number | A4 | A6 | A8 | A10 | A12 | A14 | A16 |
|---|---|---|---|---|---|---|---|
| S1 | 3.7757E−02 | −1.0400E−02 | 2.9207E−03 | −5.6859E−04 | 7.1944E−05 | −5.1481E−06 | 1.5475E−07 |
| S2 | 9.4685E−03 | −5.0971E−03 | 2.1442E−03 | −6.3621E−04 | 1.0167E−04 | −8.1198E−06 | 2.5787E−07 |
| S3 | −4.9957E−02 | 4.8321E−03 | 7.7849E−03 | −4.3151E−03 | −3.0706E−04 | 4.2106E−04 | −5.8431E−05 |
| S4 | 3.8856E−03 | 5.2522E−02 | −9.2199E−02 | 1.9844E−01 | −2.0316E−01 | 1.0827E−01 | −2.2337E−02 |
| S5 | 4.4138E−03 | 2.1073E−02 | −5.1030E−02 | 9.1077E−02 | −9.4046E−02 | 5.2256E−02 | −1.2792E−02 |
| S6 | 4.5485E−03 | −9.7989E−03 | 4.2018E−02 | −7.6240E−02 | 7.6040E−02 | −3.7702E−02 | 6.9137E−03 |
| S7 | −2.9637E−03 | −3.8323E−03 | −3.8055E−03 | 7.3491E−03 | −7.9675E−03 | 3.9851E−03 | −7.2113E−04 |
| S8 | −5.3535E−03 | −9.0094E−03 | 1.4663E−02 | −1.7341E−02 | 1.1022E−02 | −3.9429E−03 | 6.0171E−04 |
| S9 | −4.7393E−02 | −2.4350E−03 | 1.4857E−02 | −2.8791E−03 | −9.3007E−04 | 7.5200E−04 | −1.2524E−04 |
| S10 | −4.3344E−02 | −1.2053E−02 | 1.2713E−02 | −4.1459E−03 | 4.2571E−04 | 9.0042E−05 | −1.8304E−05 |
| S11 | −8.1805E−02 | 4.8807E−02 | −1.7299E−02 | 3.5859E−03 | −3.7723E−04 | 7.9305E−06 | 1.2053E−06 |
| S12 | −1.5722E−01 | 6.3964E−02 | −1.5178E−02 | 1.0055E−03 | 4.9191E−04 | −1.2703E−04 | 9.1290E−06 |
| S13 | −7.1755E−02 | 8.5884E−03 | 9.1072E−04 | −7.3719E−04 | 1.5762E−04 | −1.5358E−05 | 5.8076E−07 |
| S14 | 2.9399E−02 | −2.5495E−02 | 8.8250E−03 | −1.2573E−03 | 3.0603E−05 | 8.9684E−06 | −6.2371E−07 |
| S15 | −1.2915E−01 | 5.4448E−03 | 7.7953E−03 | −2.4214E−03 | 3.3669E−04 | −2.3956E−05 | 7.0868E−07 |
| S16 | −1.5930E−01 | 4.4540E−02 | −7.0474E−03 | 6.3916E−04 | −3.0754E−05 | 5.8496E−07 | 1.6703E−09 |
| S17 | −5.3578E−02 | 2.9229E−02 | −6.1505E−03 | 6.5712E−04 | −3.5852E−05 | 8.4908E−07 | −3.8159E−09 |
| S18 | −3.0756E−02 | 7.0859E−03 | −9.9906E−04 | 8.3485E−05 | −4.1861E−06 | 1.1760E−07 | −1.4336E−09 |

Figure 4A:
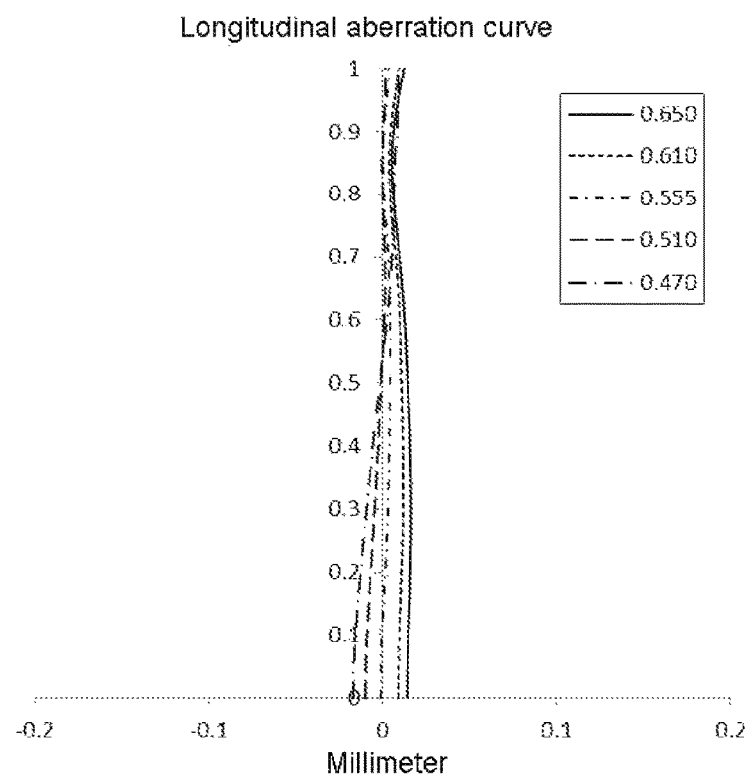
FIGS. 4A to 4D show a longitudinal aberration curve, an astigmatism curve, a distortion curve and a lateral color curve of an optical imaging lens assembly according to embodiment 2 respectively.
Figure 4B:
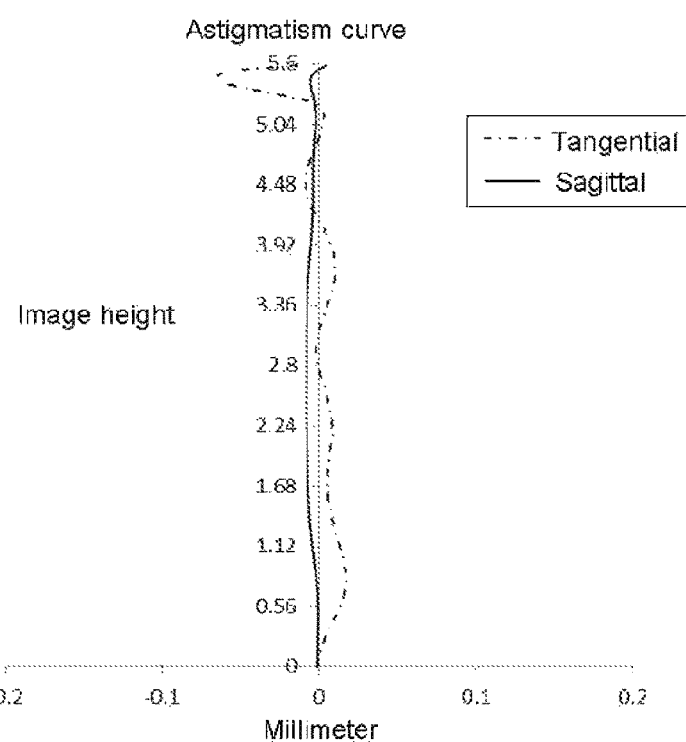
Figure 4C:
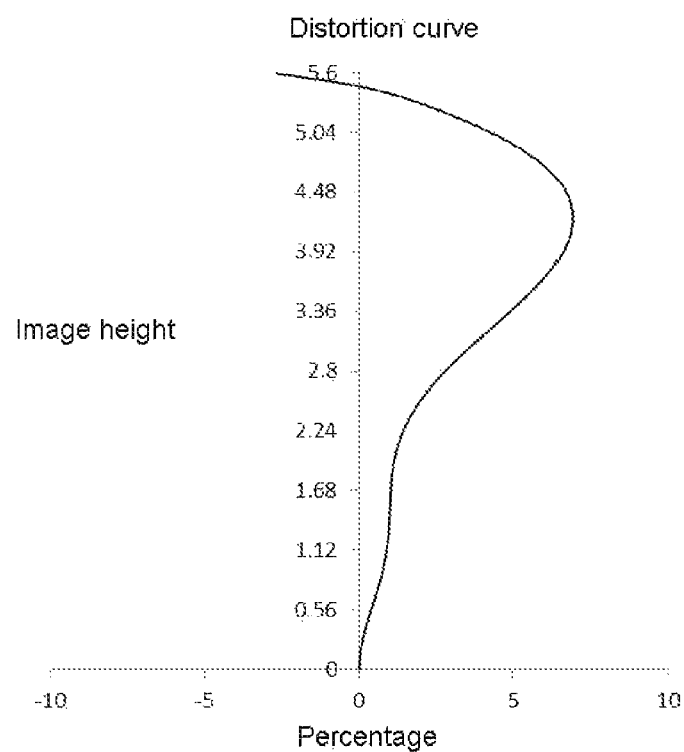
Figure 4D:
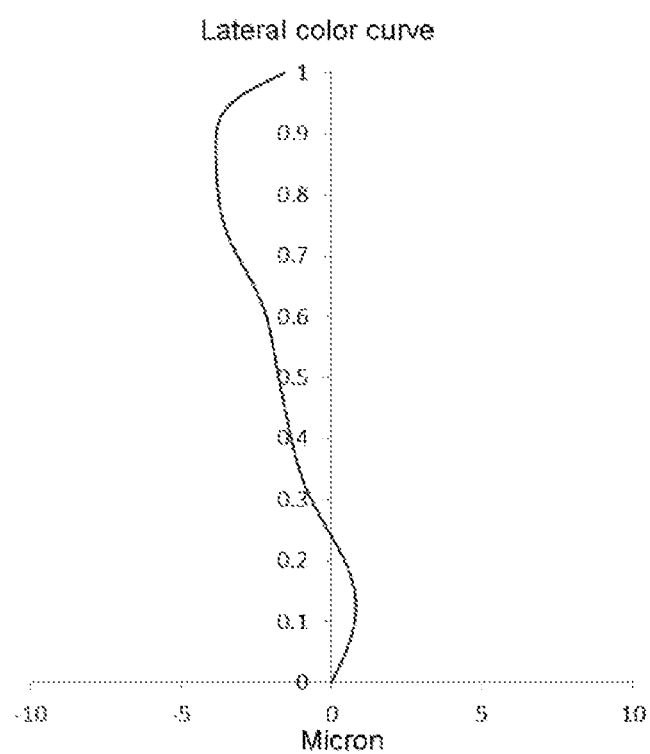

FIG. 4A shows a longitudinal aberration curve of the optical imaging lens assembly according to embodiment 2 to represent deviations of a convergence focal point after light with different wavelengths passes through the lens assembly. FIG. 4B shows an astigmatism curve of the optical imaging lens assembly according to embodiment 2 to represent a tangential image surface curvature and a sagittal image surface curvature. FIG. 4C shows a distortion curve of the optical imaging lens assembly according to embodiment 2 to represent distortion values corresponding to different image heights. FIG. 4D shows a lateral color curve of the optical imaging lens assembly according to embodiment 2 to represent deviations of different image heights on the imaging surface after the light passes through the lens assembly. According to FIGS. 4A to 4D, it can be seen that the optical imaging lens assembly provided in embodiment 2 may achieve high imaging quality.

Embodiment 3

Figure 5:
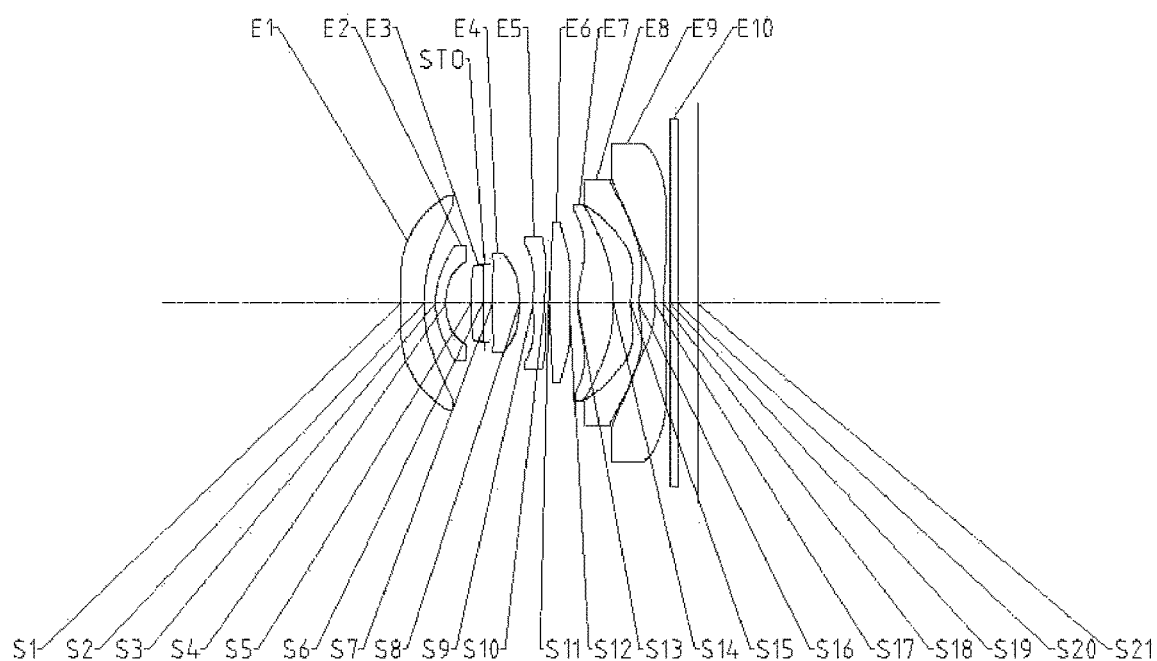
FIG. 5 shows a structure diagram of an optical imaging lens assembly according to embodiment 3 of the disclosure.

An optical imaging lens assembly according to embodiment 3 of the disclosure is described below with reference to FIGS. 5 to 6D. FIG. 5 shows a structure diagram of an optical imaging lens assembly according to embodiment 3 of the disclosure.

As shown in FIG. 5, the optical imaging lens assembly sequentially includes, from an object side to an image side, a first lens E1, a second lens E2, a third lens E3, a diaphragm STO, a fourth lens E4, a fifth lens E5, a sixth lens E6, a seventh lens E7, an eighth lens E8, a ninth lens E9, an optical filter E10, and an imaging surface S21.

The first lens E1 has a negative refractive power, an object-side surface S1 thereof is a concave surface, while an image-side surface S2 is a concave surface. The second lens E2 has a positive refractive power, an object-side surface S3 thereof is a convex surface, while an image-side surface S4 is a concave surface. The third lens E3 has a positive refractive power, an object-side surface S5 thereof is a convex surface, while an image-side surface S6 is a convex surface. The fourth lens E4 has a positive refractive power, an object-side surface S7 thereof is a convex surface, while an image-side surface S8 is a convex surface. The fifth lens E5 has a negative refractive power, an object-side surface S9 thereof is a convex surface, while an image-side surface S10 is a concave surface. The sixth lens E6 has a negative refractive power, an object-side surface S11 thereof is a convex surface, while an image-side surface S12 is a concave surface. The seventh lens E7 has a positive refractive power, an object-side surface S13 thereof is a convex surface, while an image-side surface S14 is a convex surface. The eighth lens E8 has a negative refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

In the example, a total effective focal length f of the optical imaging lens assembly is 3.30 mm. TTL is a total length of the optical imaging lens assembly, and TTL is 8.30 mm. ImgH is a half of a diagonal length of an effective pixel region on the imaging surface S21 of the optical imaging lens assembly, and ImgH is 5.59 mm. FOV is a maximum field of view of the optical imaging lens assembly, and FOV is 120.0°.

Table 5 is a basic parameter table of the optical imaging lens assembly of embodiment 3, and units of the curvature radius, the thickness/distance and the focal length are all millimeter (mm). Table 6 shows high-order coefficients that can be used for each aspheric mirror surface in embodiment 3. A surface type of each aspheric surface may be defined by the formula (1) given in embodiment 1.

TABLE 5

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | −323.5884 | 0.6569 | 1.57 | 37.3 | −7.90 | 0.0000 |
| S2 | Aspheric | 4.5710 | 0.3096 | | | | 0.0000 |
| S3 | Aspheric | 1.9513 | 0.3023 | 1.67 | 19.2 | 168.82 | 0.0000 |
| S4 | Aspheric | 1.8609 | 0.7041 | | | | 0.0000 |
| S5 | Aspheric | 8.6631 | 0.3266 | 1.54 | 56.1 | 15.42 | 0.0000 |
| S6 | Aspheric | −294.5213 | 0.0455 | | | | 0.0000 |
| STO | Spherical | Infinite | 0.2276 | | | | |
| S7 | Aspheric | 18.4932 | 0.7604 | 1.54 | 56.1 | 5.77 | 0.0000 |
| S8 | Aspheric | −3.7384 | 0.3842 | | | | 0.0000 |
| S9 | Aspheric | 8.9082 | 0.3285 | 1.67 | 19.2 | −29.31 | 0.0000 |
| S10 | Aspheric | 6.0581 | 0.1161 | | | | 0.0000 |
| S11 | Aspheric | 5.6010 | 0.5501 | 1.54 | 56.1 | −25.84 | 0.0000 |
| S12 | Aspheric | 3.8703 | 0.2282 | | | | 0.0000 |
| S13 | Aspheric | 2.3359 | 1.0142 | 1.54 | 56.1 | 2.92 | −1.2021 |
| S14 | Aspheric | −4.2418 | 0.4721 | | | | 0.0000 |
| S15 | Aspheric | 2.8027 | 0.2500 | 1.67 | 19.2 | −55.61 | −0.8344 |
| S16 | Aspheric | 2.5147 | 0.4341 | | | | −1.0163 |
| S17 | Aspheric | −3.5412 | 0.2500 | 1.67 | 19.2 | −3.37 | −0.9473 |
| S18 | Aspheric | 6.6052 | 0.1892 | | | | 0.0000 |
| S19 | Spherical | Infinite | 0.2100 | 1.52 | 64.2 | | |
| S20 | Spherical | Infinite | 0.5400 | | | | |
| S21 | Spherical | Infinite | | | | | |

TABLE 6

| Surface number | A4 | A6 | A8 | A10 | A12 | A14 | A16 |
|---|---|---|---|---|---|---|---|
| S1 | 3.7938E−02 | −1.0448E−02 | 2.9031E−03 | −5.5858E−04 | 6.9739E−05 | −4.9228E−06 | 1.4660E−07 |
| S2 | 9.1676E−03 | −4.8413E−03 | 1.9836E−03 | −5.7425E−04 | 8.9582E−05 | −6.9717E−06 | 2.1531E−07 |
| S3 | −4.9747E−02 | 5.0044E−03 | 6.9809E−03 | −3.5674E−03 | −6.5302E−04 | 5.0369E−04 | −6.6587E−05 |
| S4 | 4.8094E−03 | 5.3456E−02 | −9.4550E−02 | 2.0269E−01 | −2.0680E−01 | 1.0995E−01 | −2.2575E−02 |
| S5 | 4.8417E−03 | 2.0671E−02 | −4.8556E−02 | 8.6289E−02 | −8.9070E−02 | 4.9771E−02 | −1.2346E−02 |
| S6 | 4.9199E−03 | −1.0749E−02 | 4.6069E−02 | −8.4285E−02 | 8.4697E−02 | −4.2348E−02 | 7.8870E−03 |
| S7 | −2.9413E−03 | −3.2993E−03 | −5.4086E−03 | 9.8660E−03 | −1.0099E−02 | 4.9135E−03 | −8.7763E−04 |
| S8 | −5.3822E−02 | −9.6333E−03 | 1.6003E−02 | −1.8974E−02 | 1.2261E−02 | −4.4543E−03 | 6.9183E−04 |
| S9 | −4.6605E−02 | −2.7523E−02 | 1.7933E−02 | −4.8022E−03 | −1.3847E−04 | 5.7475E−04 | −1.0942E−04 |
| S10 | −4.3181E−02 | −1.3115E−02 | 1.3745E−02 | −4.7468E−03 | 6.4704E−04 | 4.7316E−05 | −1.5114E−05 |
| S11 | −8.2920E−02 | 5.0798E−02 | −1.8875E−02 | 4.2126E−03 | −5.0916E−04 | 2.1853E−05 | 6.3997E−07 |
| S12 | −1.5889E−01 | 6.4772E−02 | −1.5432E−02 | 9.9554E−04 | 5.2222E−04 | −1.3419E−04 | 9.6579E−06 |
| S13 | −7.2405E−02 | 9.1457E−03 | 6.2526E−04 | −6.5111E−04 | 1.4075E−04 | −1.3470E−05 | 4.9442E−07 |
| S14 | 2.9020E−02 | −2.5113E−02 | 8.4619E−03 | −1.0887E−03 | −8.2192E−06 | 1.3225E−05 | −8.0135E−07 |
| S15 | −1.3062E−01 | 6.1212E−02 | 7.6984E−03 | −2.4028E−03 | 3.3180E−05 | −2.3359E−05 | 6.8326E−07 |
| S16 | −1.5947E−01 | 4.4679E−02 | −7.0921E−03 | 6.4635E−04 | −3.1430E−05 | 6.2176E−07 | 8.0601E−10 |
| S17 | −5.3730E−02 | 2.9304E−02 | −6.1871E−03 | 6.6577E−04 | −3.6856E−05 | 9.0777E−07 | −5.2062E−09 |
| S18 | −3.1153E−02 | 7.3112E−03 | −1.0378E−03 | 8.6988E−05 | −4.3627E−06 | 1.2230E−07 | −1.4856E−09 |

Figure 6A:
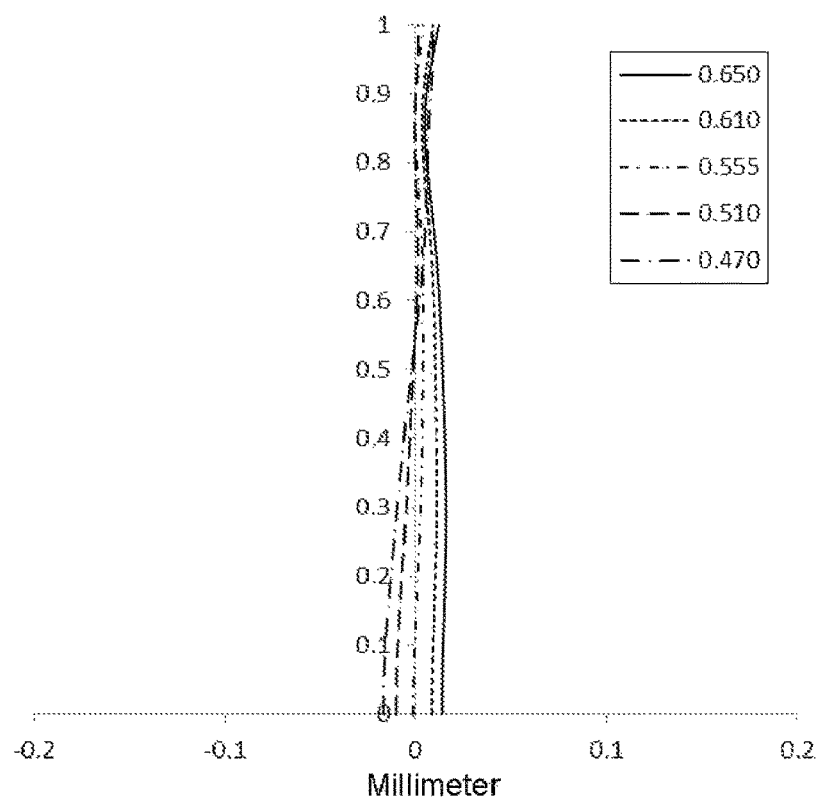
FIGS. 6A to 6D show a longitudinal aberration curve, an astigmatism curve, a distortion curve and a lateral color curve of an optical imaging lens assembly according to embodiment 3 respectively.
Figure 6B:
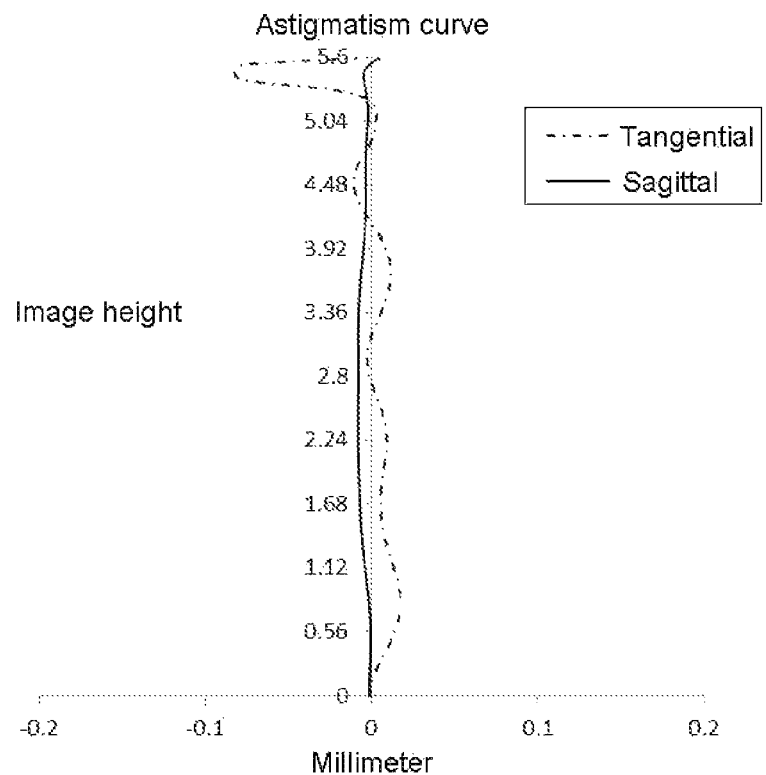
Figure 6C:
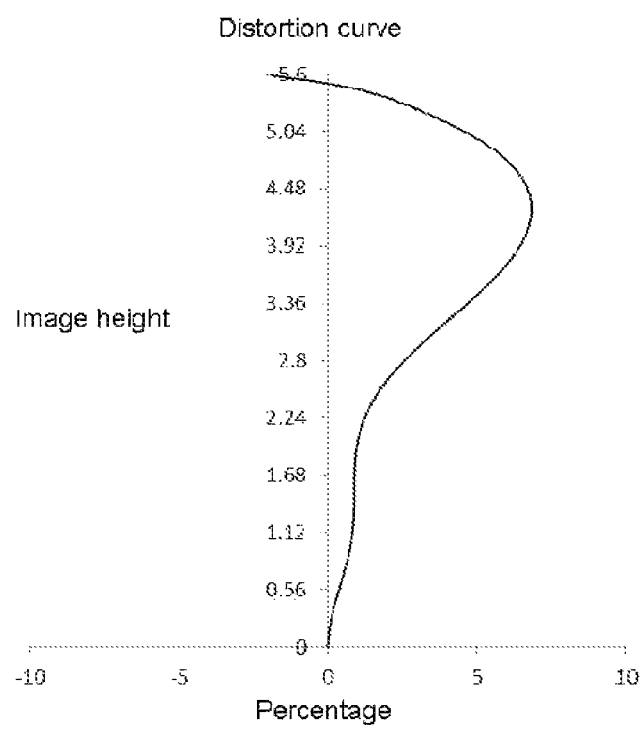
Figure 6D:
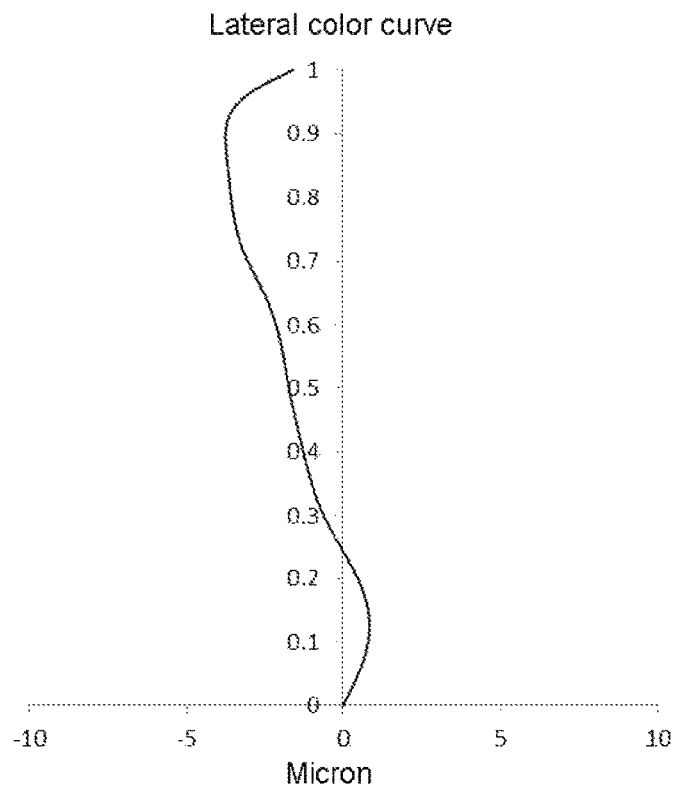

FIG. 6A shows a longitudinal aberration curve of the optical imaging lens assembly according to embodiment 3 to represent deviations of a convergence focal point after light with different wavelengths passes through the lens assembly. FIG. 6B shows an astigmatism curve of the optical imaging lens assembly according to embodiment 3 to represent a tangential image surface curvature and a sagittal image surface curvature. FIG. 6C shows a distortion curve of the optical imaging lens assembly according to embodiment 3 to represent distortion values corresponding to different image heights. FIG. 6D shows a lateral color curve of the optical imaging lens assembly according to embodiment 3 to represent deviations of different image heights on the imaging surface after the light passes through the lens assembly. According to FIGS. 6A to 6D, it can be seen that the optical imaging lens assembly provided in embodiment 3 may achieve high imaging quality.

Embodiment 4

Figure 7:
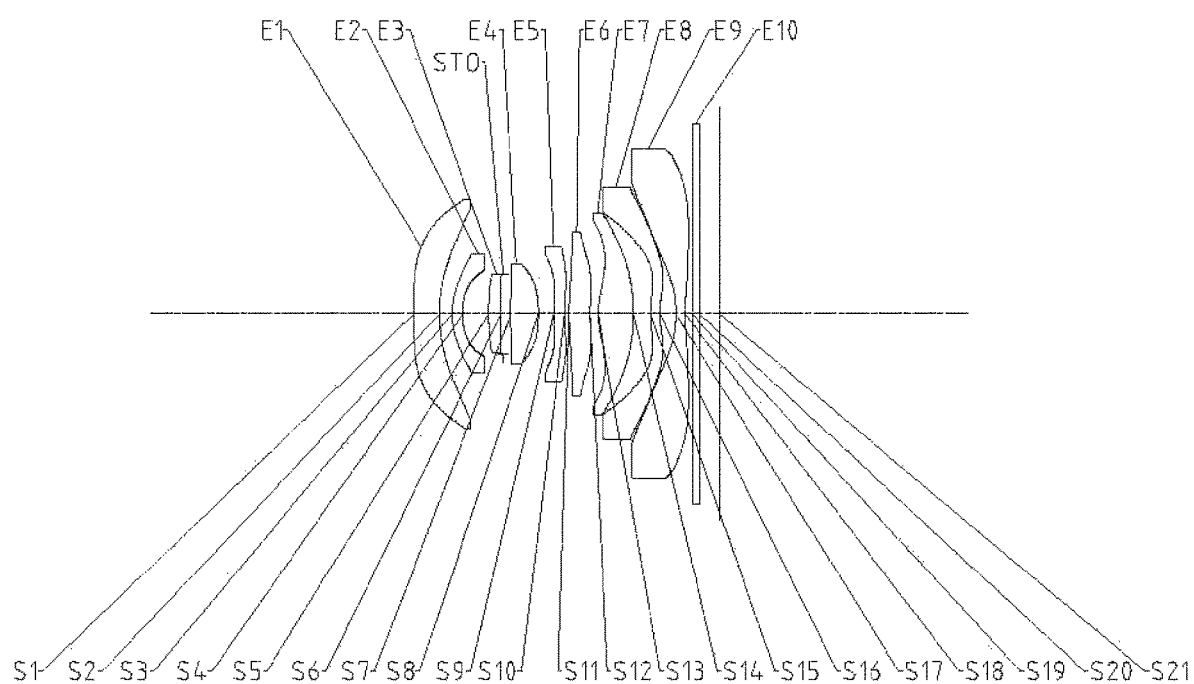
FIG. 7 shows a structure diagram of an optical imaging lens assembly according to embodiment 4 of the disclosure.

An optical imaging lens assembly according to embodiment 4 of the disclosure is described below with reference to FIGS. 7 to 8D. FIG. 7 shows a structure diagram of an optical imaging lens assembly according to embodiment 4 of the disclosure.

As shown in FIG. 7, the optical imaging lens assembly sequentially includes, from an object side to an image side, a first lens E1, a second lens E2, a third lens E3, a diaphragm STO, a fourth lens E4, a fifth lens E5, a sixth lens E6, a seventh lens E7, an eighth lens E8, a ninth lens E9, an optical filter E10, and an imaging surface S21.

The first lens E1 has a negative refractive power, an object-side surface S1 thereof is a concave surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a convex surface. The fourth lens E4 has a positive refractive power, an object-side surface S7 thereof is a convex surface, while an image-side surface S8 is a convex surface. The fifth lens E5 has a negative refractive power, an object-side surface S9 thereof is a convex surface, while an image-side surface S10 is a concave surface. The sixth lens E6 has a negative refractive power, an object-side surface S11 thereof is a convex surface, while an image-side surface S12 is a concave surface. The seventh lens E7 has a positive refractive power, an object-side surface S13 thereof is a convex surface, while an image-side surface S14 is a convex surface. The eighth lens E8 has a negative refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

In the example, a total effective focal length f of the optical imaging lens assembly is 3.28 mm. TTL is a total length of the optical imaging lens assembly, and TTL is 8.30 mm. ImgH is a half of a diagonal length of an effective pixel region on the imaging surface S21 of the optical imaging lens assembly, and ImgH is 5.59 mm. FOV is a maximum field of view of the optical imaging lens assembly, and FOV is 120.0°.

Table 7 shows a basic parameter table of the optical imaging lens assembly of embodiment 4, and units of the curvature radius, the thickness/distance and the focal length are all millimeter (mm). Table 8 shows high-order coefficients that can be used for each aspheric mirror surface in embodiment 4. A surface type of each aspheric surface may be defined by the formula (1) given in embodiment 1.

TABLE 7

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | −4993.3651 | 0.7009 | 1.57 | 37.3 | −8.49 | 0.0000 |
| S2 | Aspheric | 4.8457 | 0.3391 | | | | 0.0000 |
| S3 | Aspheric | 1.9896 | 0.2897 | 1.67 | 19.2 | −100.03 | 0.0000 |

TABLE 7-continued

| Surface number | Surface type | Curvature radius | Thickness/ distance | Material Refractive index | Abbe number | Focal length | Conic coefficient |
|---|---|---|---|---|---|---|---|
| S4 | Aspheric | 1.8192 | 0.6976 | | | | 0.0000 |
| S5 | Aspheric | 8.3117 | 0.3344 | 1.54 | 56.1 | 14.23 | 0.0000 |
| S6 | Aspheric | −116.8107 | 0.0587 | | | | 0.0000 |
| STO | Spherical | Infinite | 0.2121 | | | | |
| S7 | Aspheric | 17.1185 | 0.7458 | 1.54 | 56.1 | 5.62 | 0.0000 |
| S8 | Aspheric | −3.6790 | 0.4046 | | | | 0.0000 |
| S9 | Aspheric | 9.3321 | 0.3081 | 1.67 | 19.2 | −28.10 | 0.0000 |
| S10 | Aspheric | 6.1790 | 0.1205 | | | | 0.0000 |
| S11 | Aspheric | 5.4095 | 0.5711 | 1.54 | 56.1 | −26.66 | 0.0000 |
| S12 | Aspheric | 3.7966 | 0.2248 | | | | 0.0000 |
| S13 | Aspheric | 2.3118 | 0.9560 | 1.54 | 56.1 | 2.93 | −1.2984 |
| S14 | Aspheric | −4.4177 | 0.4716 | | | | 0.0000 |
| S15 | Aspheric | 2.7806 | 0.2500 | 1.67 | 19.2 | −46.06 | −0.7992 |
| S16 | Aspheric | 2.4604 | 0.4289 | | | | −1.0242 |
| S17 | Aspheric | −3.5935 | 0.2500 | 1.67 | 19.2 | −3.39 | −0.9645 |
| S18 | Aspheric | 6.5203 | 0.1862 | | | | 0.0000 |
| S19 | Spherical | Infinite | 0.2100 | 1.52 | 64.2 | | |
| S20 | Spherical | Infinite | 0.5400 | | | | |
| S21 | Spherical | Infinite | | | | | |

TABLE 8

| Surface number | A4 | A6 | A8 | A10 | A12 | A14 | A16 |
|---|---|---|---|---|---|---|---|
| S1 | 3.3855E−02 | −8.6169E−03 | 2.2166E−03 | −3.9419E−04 | 4.5378E−05 | −2.9368E−06 | 7.9767E−08 |
| S2 | 7.9236E−03 | −3.8399E−03 | 1.4125E−03 | −3.6707E−04 | 5.1750E−05 | −3.6503E−06 | 1.0222E−07 |
| S3 | −4.8989E−02 | 6.8642E−03 | 5.1372E−03 | −2.7899E−03 | −9.5362E−04 | 5.9970E−04 | −7.7610E−05 |
| S4 | 3.3997E−03 | 5.9151E−02 | −1.0149E−01 | 2.1115E−01 | −2.1462E−01 | 1.1496E−01 | −2.4040E−02 |
| S5 | 7.7872E−03 | 1.8042E−02 | −3.5334E−02 | 6.0163E−02 | −5.9498E−02 | 3.2494E−02 | −8.3307E−03 |
| S6 | 6.7095E−03 | −1.2705E−02 | 5.3235E−02 | −9.5577E−02 | 9.5047E−02 | −4.6826E−02 | 8.5107E−03 |
| S7 | −2.3300E−03 | −3.7777E−03 | −3.9807E−03 | 7.6874E−03 | −8.6948E−03 | 4.6405E−03 | −8.7891E−04 |
| S8 | −5.2989E−02 | −1.2009E−02 | 1.9832E−02 | −2.3608E−02 | 1.5775E−02 | −5.9318E−03 | 9.7249E−04 |
| S9 | −4.5491E−02 | −3.6036E−02 | 2.4486E−02 | −7.8264E−03 | 6.6443E−04 | 5.5436E−04 | −1.3088E−04 |
| S10 | −4.2396E−02 | −1.9931E−02 | 1.9393E−02 | −7.1023E−03 | 1.2137E−03 | −1.3254E−05 | −1.4671E−05 |
| S11 | −8.4038E−02 | 5.1293E−02 | −1.8904E−02 | 4.1481E−03 | −4.8862E−04 | 2.0221E−05 | 5.7609E−07 |
| S12 | −1.6333E−01 | 6.3046E−02 | −1.2576E−02 | −5.3956E−04 | 9.4263E−04 | −1.9161E−04 | 1.2784E−05 |
| S13 | −7.0476E−02 | 4.7961E−03 | 3.1022E−03 | −1.4068E−03 | 2.6351E−04 | −2.3171E−05 | 7.8044E−07 |
| S14 | 3.2998E−02 | −2.8812E−02 | 9.7145E−03 | −1.2196E−03 | −2.7575E−05 | 1.8299E−05 | −1.0903E−06 |
| S15 | −1.3582E−01 | 5.5386E−03 | 9.0266E−03 | −2.8597E−03 | 4.0845E−04 | −3.0138E−05 | 9.4007E−07 |
| S16 | −1.6367E−01 | 4.6806E−02 | −7.6400E−03 | 7.2755E−04 | −3.8680E−05 | 9.8726E−07 | −7.0527E−09 |
| S17 | −5.2890E−02 | 2.9063E−02 | −6.2341E−03 | 6.9085E−04 | −4.0603E−05 | 1.1576E−06 | −1.1524E−08 |
| S18 | −3.2099E−02 | 7.5492E−03 | −1.0722E−03 | 8.9866E−05 | −4.5009E−06 | 1.2598E−07 | −1.5279E−09 |

Figure 8A:
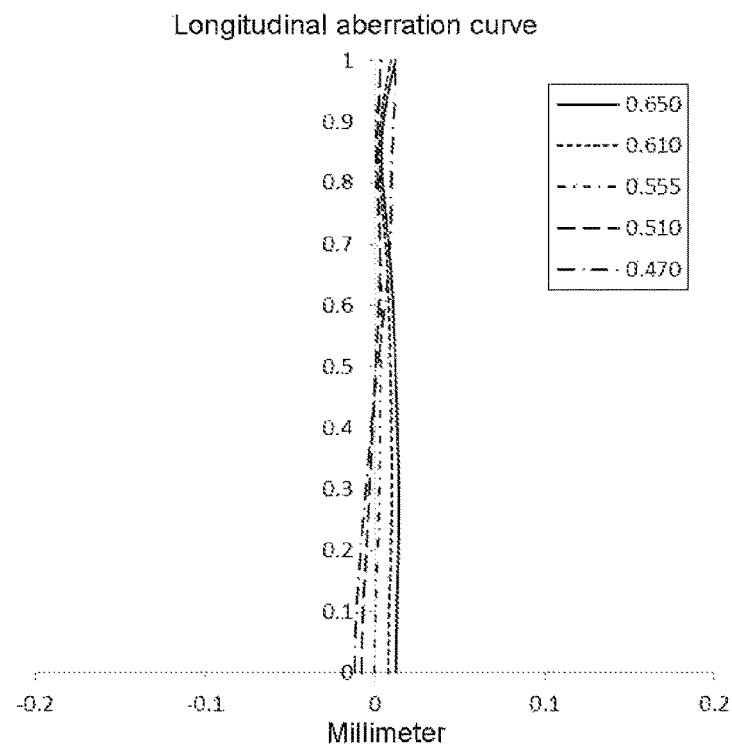
FIGS. 8A to 8D show a longitudinal aberration curve, an astigmatism curve, a distortion curve and a lateral color curve of an optical imaging lens assembly according to embodiment 4 respectively.
Figure 8B:
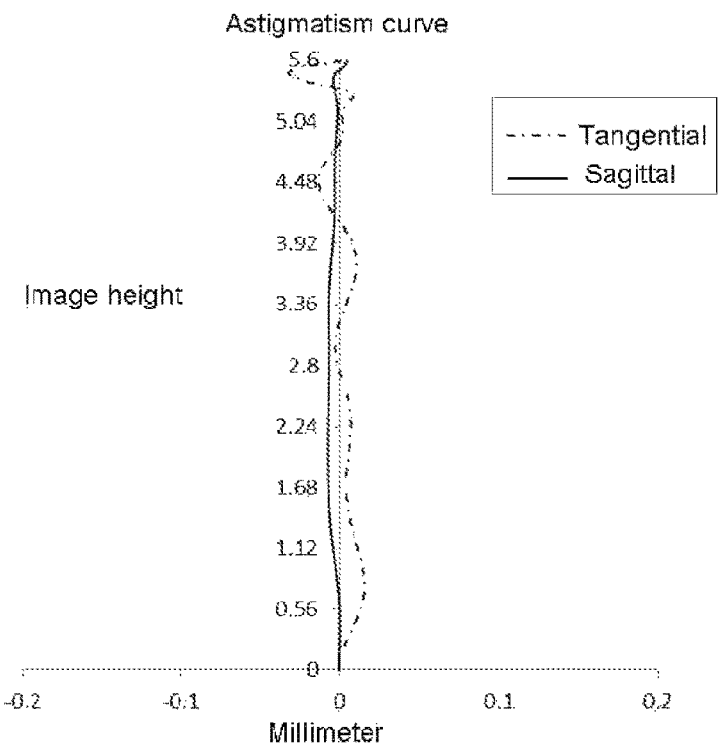
Figure 8C:
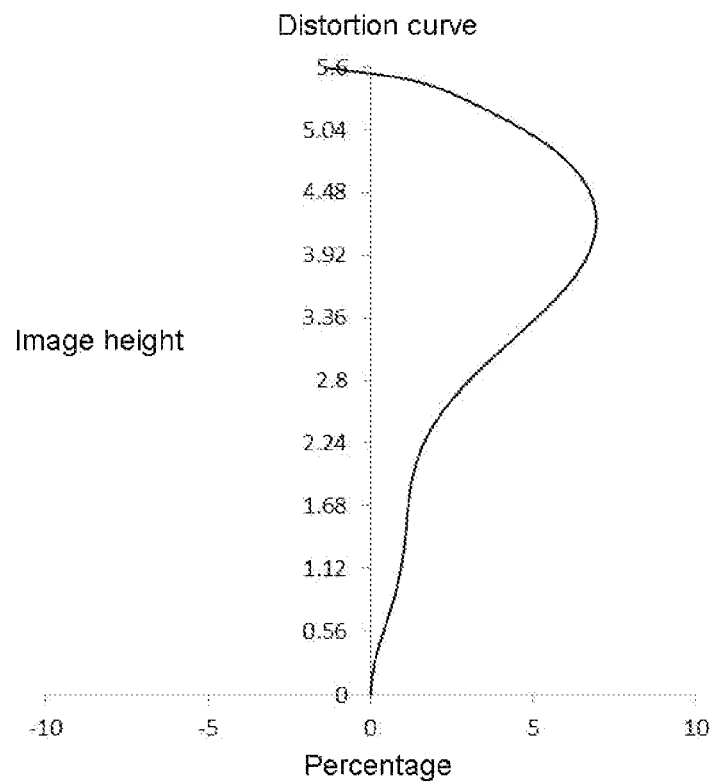
Figure 8D:
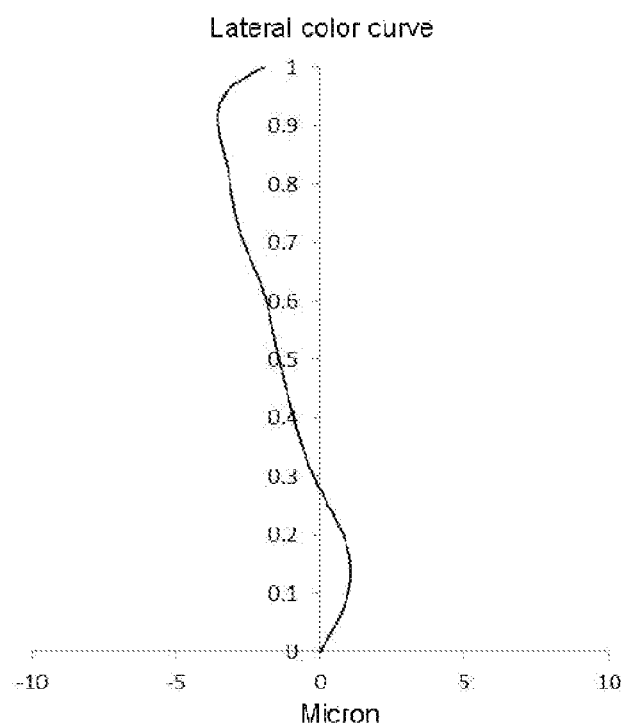

FIG. 8A shows a longitudinal aberration curve of the optical imaging lens assembly according to embodiment 4 to represent deviations of a convergence focal point after light with different wavelengths passes through the lens assembly. FIG. 8B shows an astigmatism curve of the optical imaging lens assembly according to embodiment 4 to represent a tangential image surface curvature and a sagittal image surface curvature. FIG. 8C shows a distortion curve of the optical imaging lens assembly according to embodiment 4 to represent distortion values corresponding to different image heights. FIG. 8D shows a lateral color curve of the optical imaging lens assembly according to embodiment 4 to represent deviations of different image heights on the imaging surface after the light passes through the lens assembly. According to FIGS. 8A to 8D, it can be seen that the optical imaging lens assembly provided in embodiment 4 may achieve high imaging quality.

Embodiment 5

Figure 9:
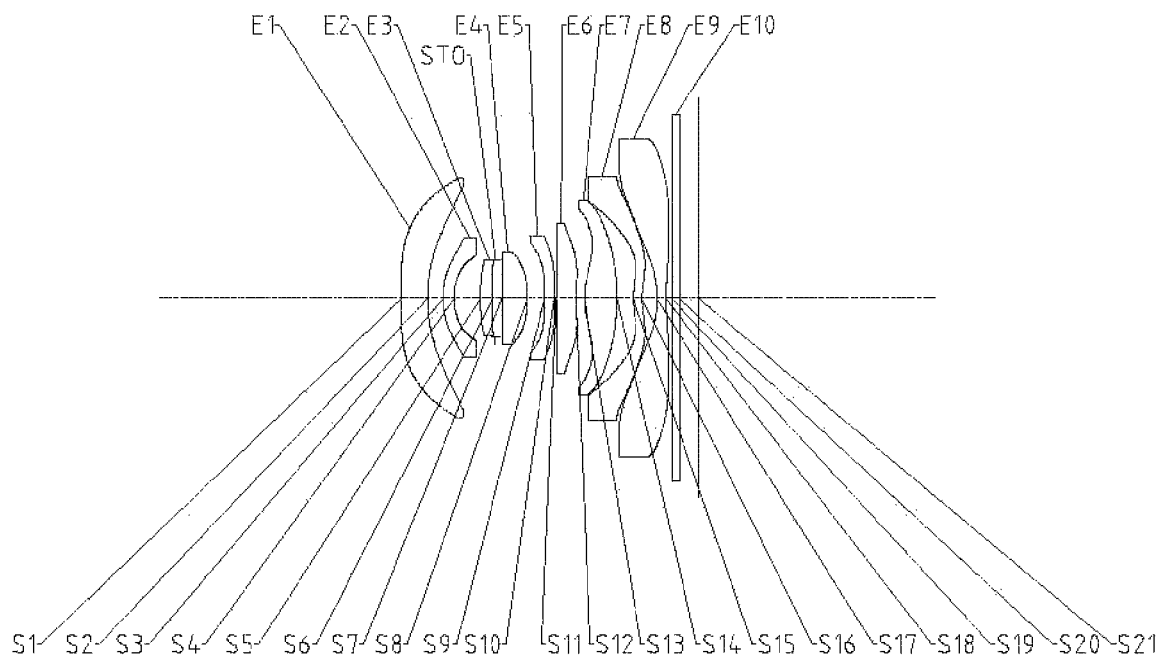
FIG. 9 shows a structure diagram of an optical imaging lens assembly according to embodiment 5 of the disclosure.

An optical imaging lens assembly according to embodiment 5 of the disclosure is described below with reference to FIGS. 9 to 10D. FIG. 9 shows a structure diagram of an optical imaging lens assembly according to embodiment 5 of the disclosure.

As shown in FIG. 9, the optical imaging lens assembly sequentially includes, from an object side to an image side, a first lens E1, a second lens E2, a third lens E3, a diaphragm STO, a fourth lens E4, a fifth lens E5, a sixth lens E6, a seventh lens E7, an eighth lens E8, a ninth lens E9, an optical filter E10, and an imaging surface S21.

The first lens E1 has a negative refractive power, an object-side surface S1 thereof is a concave surface, while an image-side surface S2 is a concave surface. The second lens E2 has a positive refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a convex surface. The fifth lens E5 has a negative refractive power, an object-side surface S9 thereof is a concave surface, while an image-side surface S10 is a concave surface. The sixth lens E6 has a negative refractive power, an object-side surface S11 thereof is a convex surface, while an image-side surface S12 is a concave surface. The seventh lens E7 has a positive refractive power, an object-side surface S13 thereof is a convex surface, while an image-side surface S14 is a convex surface. The eighth lens E8 has a negative refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

In the example, a total effective focal length f of the optical imaging lens assembly is 3.19 mm. TTL is a total length of the optical imaging lens assembly, and TTL is 8.30 mm. ImgH is a half of a diagonal length of an effective pixel region on the imaging surface S21 of the optical imaging lens assembly, and ImgH is 5.59 mm. FOV is a maximum field of view of the optical imaging lens assembly, and FOV is 119.9°.

Table 9 shows a basic parameter table of the optical imaging lens assembly of embodiment 5, and units of the curvature radius, the thickness/distance and the focal length are all millimeter (mm). Table 10 shows high-order coefficients that can be used for each asphericaspheric mirror surface in embodiment 5. A surface type of each asphericaspheric surface may be defined by the formula (1) given in embodiment 1.

TABLE 9

| Surface number | Surface type | Curvature radius | Thickness/distance | Material Refractive index | Abbe number | Focal length | Conic coefficient |
|---|---|---|---|---|---|---|---|
| OBJ | Spherical | Infinite | Infinite | | | | |
| S1 | Aspheric | −139.2218 | 0.7288 | 1.57 | 37.3 | −7.99 | 0.0000 |
| S2 | Aspheric | 4.7228 | 0.4282 | | | | 0.0000 |
| S3 | Aspheric | 1.9610 | 0.3191 | 1.67 | 19.2 | 698.09 | 0.0000 |
| S4 | Aspheric | 1.8398 | 0.7227 | | | | 0.0000 |
| S5 | Aspheric | 7.0969 | 0.3438 | 1.54 | 56.1 | 13.81 | 0.0000 |
| S6 | Aspheric | 118.9809 | 0.0870 | | | | 0.0000 |
| STO | Spherical | Infinite | 0.1803 | | | | |
| S7 | Aspheric | 14.6661 | 0.7023 | 1.54 | 56.1 | 5.17 | 0.0000 |
| S8 | Aspheric | −3.4325 | 0.4838 | | | | 0.0000 |
| S9 | Aspheric | −33.3333 | 0.2645 | 1.67 | 19.2 | −20.91 | 0.0000 |
| S10 | Aspheric | 24.7303 | 0.0644 | | | | 0.0000 |
| S11 | Aspheric | 6.0521 | 0.5407 | 1.54 | 56.1 | −21.76 | 0.0000 |
| S12 | Aspheric | 3.8831 | 0.2360 | | | | 0.0000 |
| S13 | Aspheric | 2.1442 | 0.9116 | 1.54 | 56.1 | 2.88 | −1.4028 |
| S14 | Aspheric | −5.0104 | 0.4564 | | | | 0.0000 |
| S15 | Aspheric | 2.6482 | 0.2500 | 1.67 | 19.2 | −41.98 | −0.7089 |
| S16 | Aspheric | 2.3302 | 0.4119 | | | | −0.9941 |
| S17 | Aspheric | −3.6037 | 0.2500 | 1.67 | 19.2 | −3.38 | −1.1048 |
| S18 | Aspheric | 6.4485 | 0.1685 | | | | 0.0000 |
| S19 | Spherical | Infinite | 0.2100 | 1.52 | 64.2 | | |
| S20 | Spherical | Infinite | 0.5400 | | | | |
| S21 | Spherical | Infinite | | | | | |

TABLE 10

| Surface number | A4 | A6 | A8 | A10 | A12 | A14 | A16 |
|---|---|---|---|---|---|---|---|
| S1 | 3.0282E−02 | −7.0152E−03 | 1.5919E−03 | −2.4670E−04 | 2.4421E−05 | −1.3436E−06 | 3.0690E−08 |
| S2 | 6.1453E−03 | −2.7928E−03 | 9.4759E−04 | −2.2371E−04 | 2.7843E−05 | −1.7113E−06 | 4.1439E−08 |
| S3 | −4.4125E−02 | 1.3911E−02 | −9.1851E−03 | 1.0003E−02 | −7.1922E−03 | 2.0971E−03 | −2.1742E−04 |
| S4 | 6.2479E−03 | 8.5330E−02 | −1.7295E−01 | 3.2295E−01 | −3.1671E−01 | 1.6695E−01 | −3.6134E−02 |
| S5 | 1.5712E−02 | 2.3399E−02 | −4.7309E−02 | 9.3297E−02 | −1.0230E−01 | 5.9937E−02 | −1.5884E−02 |
| S6 | 1.5928E−02 | −1.9868E−02 | 9.2771E−02 | −1.7230E−01 | 1.8034E−01 | −9.4900E−02 | 1.8848E−02 |
| S7 | −1.4133E−03 | −2.2186E−03 | −7.6876E−03 | 1.4829E−02 | −1.7069E−02 | 9.4151E−03 | −1.8412E−03 |
| S8 | −4.5659E−02 | −1.6230E−02 | 2.6473E−02 | −3.8088E−02 | 3.0450E−02 | −1.3298E−02 | 2.4894E−03 |
| S9 | −4.0166E−02 | −5.7155E−03 | 2.6923E−02 | 6.0453E−03 | −1.2588E−02 | 5.8667E−03 | −9.1805E−04 |
| S10 | −4.2866E−02 | −3.3404E−02 | 2.8917E−02 | −9.0618E−03 | 6.2613E−04 | 3.8329E−04 | −7.4967E−05 |
| S11 | −1.0217E−01 | 7.9493E−02 | −3.9839E−02 | 1.2669E−02 | −2.4873E−03 | 2.7775E−04 | −1.3641E−05 |
| S12 | −1.8915E−01 | 8.8849E−02 | −2.6572E−02 | 3.2047E−03 | 5.3707E−04 | −1.9613E−04 | 1.5757E−05 |
| S13 | −7.0472E−02 | 8.1007E−03 | 2.2464E−03 | −1.9770E−03 | 5.4299E−04 | −6.6446E−05 | 3.0634E−06 |
| S14 | 4.3457E−02 | −3.4664E−02 | 1.2091E−02 | −1.9600E−03 | 1.0732E−04 | 5.9216E−06 | −6.5874E−07 |
| S15 | −1.5418E−01 | 8.9191E−03 | 9.6417E−03 | −2.9885E−03 | 3.7906E−04 | −2.2673E−05 | 5.2990E−07 |
| S16 | −1.8054E−01 | 5.4300E−02 | −9.3027E−03 | 9.3998E−04 | −5.5376E−05 | 1.7778E−06 | −2.4405E−08 |
| S17 | −5.2641E−02 | 2.9449E−02 | −6.4719E−03 | 7.4577E−04 | −4.6731E−05 | 1.4962E−06 | −1.8995E−08 |
| S18 | −3.7016E−02 | 9.2209E−03 | −1.3378E−03 | 1.1301E−04 | −5.6327E−06 | 1.5542E−07 | −1.8472E−09 |

Figure 10A:
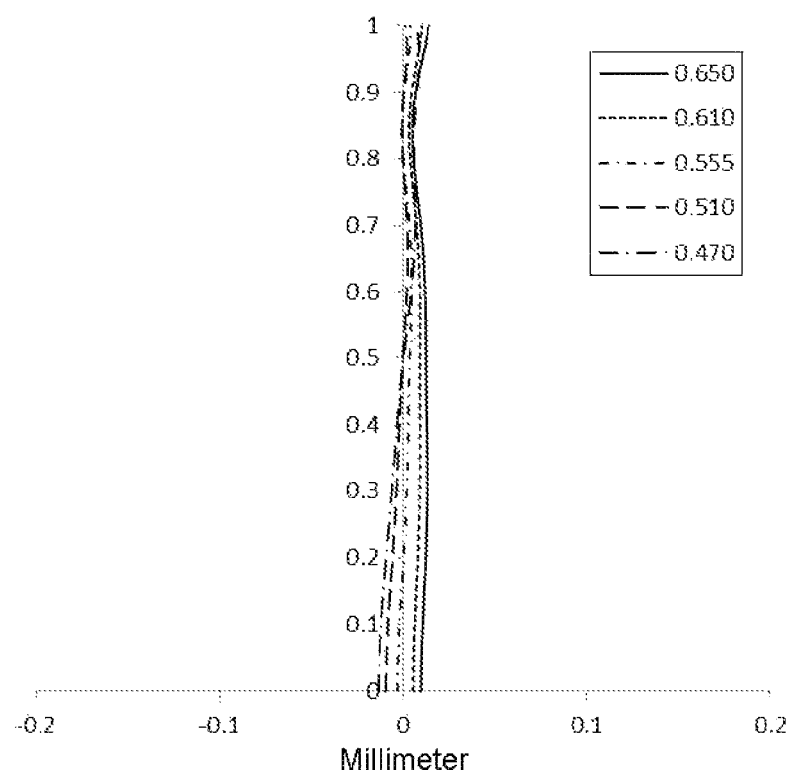
FIGS. 10A to 10D show a longitudinal aberration curve, an astigmatism curve, a distortion curve and a lateral color curve of an optical imaging lens assembly according to embodiment 5 respectively.
Figure 10B:
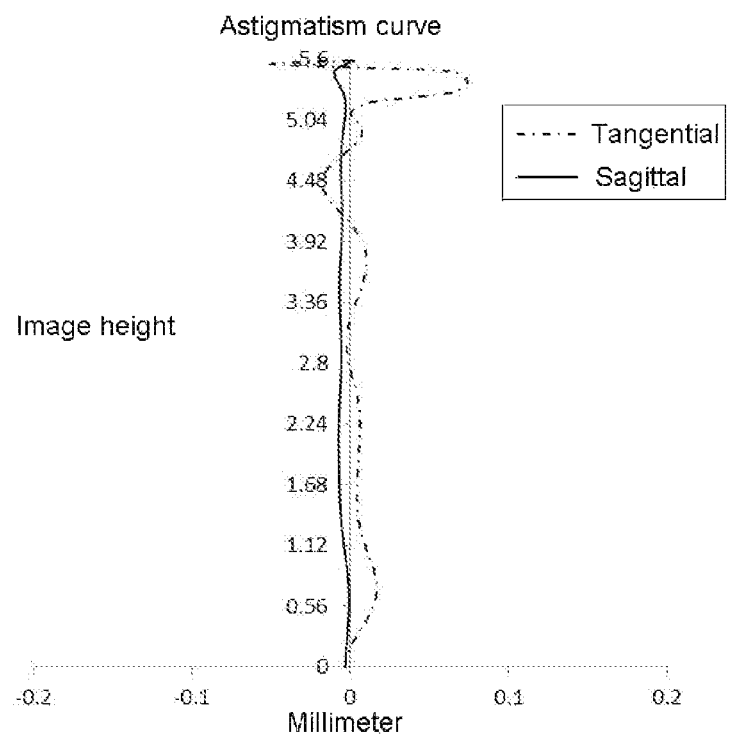
Figure 10C:
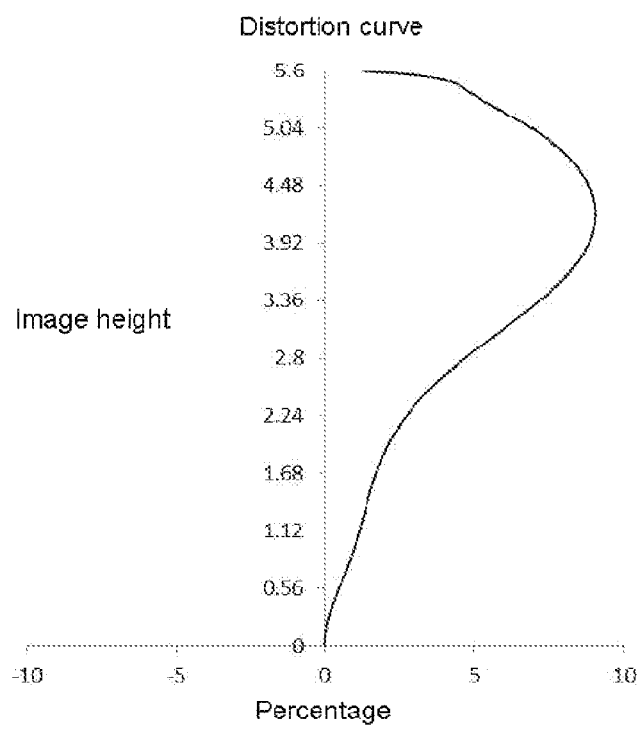
Figure 10D:
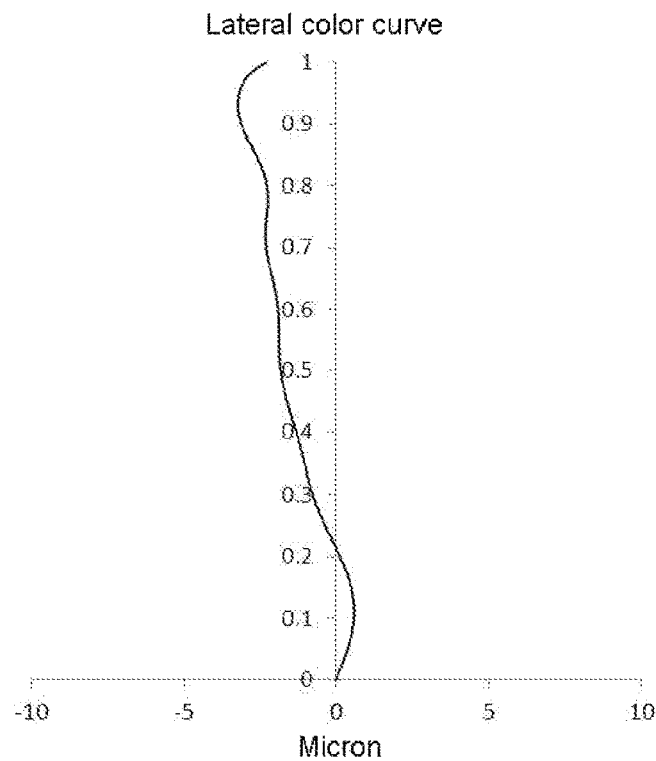

FIG. 10A shows a longitudinal aberration curve of the optical imaging lens assembly according to embodiment 5 to represent deviations of a convergence focal point after light with different wavelengths passes through the lens assembly. FIG. 10B shows an astigmatism curve of the optical imaging lens assembly according to embodiment 5 to represent a tangential image surface curvature and a sagittal image surface curvature. FIG. 10C shows a distortion curve of the optical imaging lens assembly according to embodiment 5 to represent distortion values corresponding to different image heights. FIG. 10D shows a lateral color curve of the optical imaging lens assembly according to embodiment 5 to represent deviations of different image heights on the imaging surface after the light passes through the lens assembly. According to FIGS. 10A to 10D, it can be seen that the optical imaging lens assembly provided in embodiment 5 may achieve high imaging quality.

Embodiment 6

Figure 11:
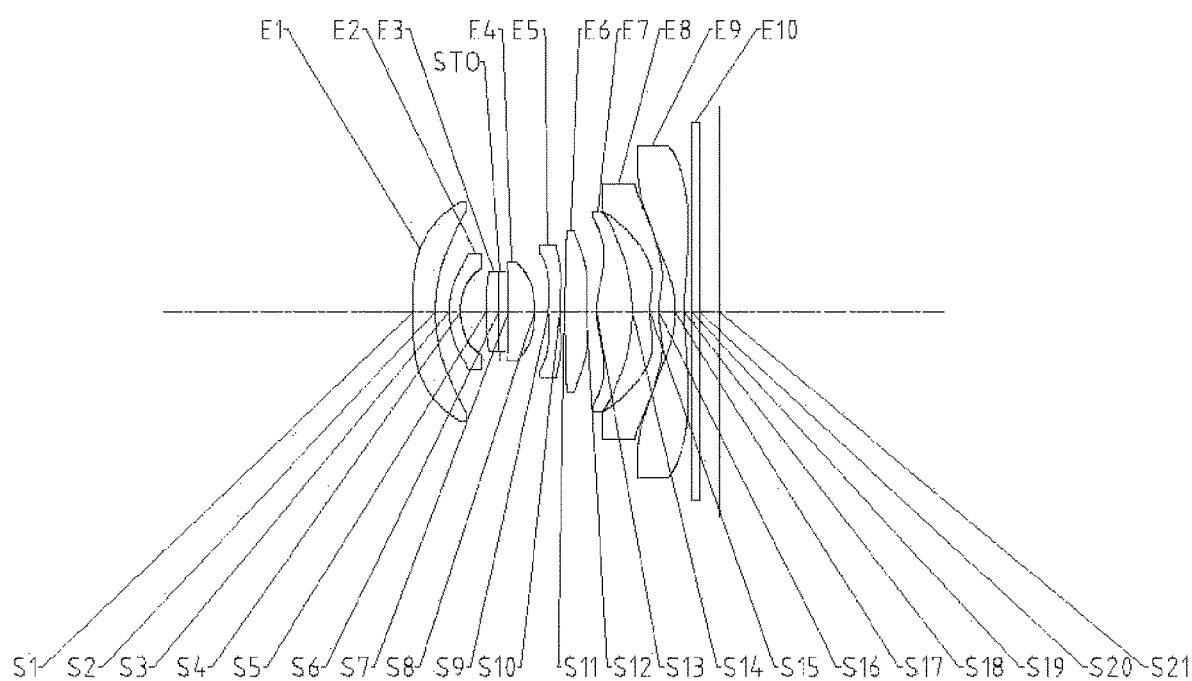
FIG. 11 shows a structure diagram of an optical imaging lens assembly according to embodiment 6 of the disclosure.

An optical imaging lens assembly according to embodiment 6 of the disclosure is described below with reference to FIGS. 11 to 12D. FIG. 11 shows a structure diagram of an optical imaging lens assembly according to embodiment 6 of the disclosure.

As shown in FIG. 11, the optical imaging lens assembly sequentially includes, from an object side to an image side, a first lens E1, a second lens E2, a third lens E3, a diaphragm STO, a fourth lens E4, a fifth lens E5, a sixth lens E6, a seventh lens E7, an eighth lens E8, a ninth lens E9, an optical filter E10, and an imaging surface S21.

The first lens E1 has a negative refractive power, an object-side surface S1 thereof is a concave surface, while an image-side surface S2 is a concave surface. The second lens E2 has a positive refractive power, an object-side surface S3 thereof is a convex surface, while an image-side surface S4 is a concave surface. The third lens E3 has a positive refractive power, an object-side surface S5 thereof is a convex surface, while an image-side surface S6 is a convex surface. The fourth lens E4 has a positive refractive power, an object-side surface S7 thereof is a concave surface, while an image-side surface S8 is a convex surface. The fifth lens E5 has a negative refractive power, an object-side surface S9 thereof is a convex surface, while an image-side surface S10 is a concave surface. The sixth lens E6 has a negative refractive power, an object-side surface S11 thereof is a convex surface, while an image-side surface S12 is a concave surface. The seventh lens E7 has a positive refractive power, an object-side surface S13 thereof is a convex surface, while an image-side surface S14 is a convex surface. The eighth lens E8 has a negative refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

In the example, a total effective focal length f of the optical imaging lens assembly is 3.31 mm. TTL is a total length of the optical imaging lens assembly, and TTL is 8.30 mm. ImgH is a half of a diagonal length of an effective pixel region on the imaging surface S21 of the optical imaging lens assembly, and ImgH is 5.59 mm. FOV is a maximum field of view of the optical imaging lens assembly, and FOV is 120.0°.

Table 11 shows a basic parameter table of the optical imaging lens assembly of embodiment 6, and units of the curvature radius, the thickness/distance and the focal length are all millimeter (mm). Table 12 shows high-order coefficients that can be used for each asphericaspheric mirror surface in embodiment 6. A surface type of each asphericaspheric surface may be defined by the formula (1) given in embodiment 1.

TABLE 11

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | −2760.4806 | 0.5891 | 1.57 | 37.3 | −8.17 | 0.0000 |
| S2 | Aspheric | 4.6699 | 0.3732 | | | | 0.0000 |
| S3 | Aspheric | 1.9633 | 0.3111 | 1.67 | 19.2 | 357.06 | 0.0000 |
| S4 | Aspheric | 1.8527 | 0.6941 | | | | 0.0000 |
| S5 | Aspheric | 9.4373 | 0.3428 | 1.54 | 56.1 | 12.55 | 0.0000 |
| S6 | Aspheric | −24.6883 | 0.0300 | | | | 0.0000 |
| STO | Spherical | Infinite | 0.2286 | | | | |
| S7 | Aspheric | −500.0000 | 0.7101 | 1.54 | 56.1 | 6.26 | 0.0000 |
| S8 | Aspheric | −3.3979 | 0.3770 | | | | 0.0000 |
| S9 | Aspheric | 10.3563 | 0.3062 | 1.67 | 19.2 | −32.44 | 0.0000 |
| S10 | Aspheric | 6.9552 | 0.1283 | | | | 0.0000 |
| S11 | Aspheric | 6.3384 | 0.6118 | 1.54 | 56.1 | −29.27 | 0.0000 |
| S12 | Aspheric | 4.3835 | 0.2712 | | | | 0.0000 |
| S13 | Aspheric | 2.3660 | 0.9671 | 1.54 | 56.1 | 2.97 | −1.2034 |
| S14 | Aspheric | −4.3852 | 0.4702 | | | | 0.0000 |
| S15 | Aspheric | 2.7109 | 0.2500 | 1.67 | 19.2 | −31.08 | −0.8444 |
| S16 | Aspheric | 2.3122 | 0.4357 | | | | −1.0038 |
| S17 | Aspheric | −3.8775 | 0.2500 | 1.67 | 19.2 | −3.51 | −1.0764 |
| S18 | Aspheric | 6.3087 | 0.2038 | | | | 0.0000 |
| S19 | Spherical | Infinite | 0.2100 | 1.52 | 64.2 | | |
| S20 | Spherical | Infinite | 0.5400 | | | | |
| S21 | Spherical | Infinite | | | | | |

TABLE 12

| Surface number | A4 | A6 | A8 | A10 | A12 | A14 | A16 |
|---|---|---|---|---|---|---|---|
| S1 | 3.6446E−02 | −9.8729E−03 | 2.7003E−03 | −5.1305E−04 | 6.3195E−05 | −4.4175E−06 | 1.3179E−07 |
| S2 | 8.2553E−02 | −4.1290E−03 | 1.5854E−03 | −4.3037E−04 | 6.3429E−05 | −4.6841E−06 | 1.3766E−07 |
| S3 | −4.9977E−02 | 9.7581E−03 | −2.2285E−03 | 5.1838E−03 | −4.9882E−03 | 1.5547E−03 | −1.6511E−04 |
| S4 | 2.8326E−03 | 6.4794E−02 | −1.2591E−01 | 2.5605E−01 | −2.5763E−01 | 1.3725E−01 | −2.8877E−02 |
| S5 | 4.1456E−03 | 2.3463E−02 | −5.0898E−02 | 9.5277E−02 | −1.0291E−01 | 6.0593E−02 | −1.5761E−02 |
| S6 | 2.9786E−03 | −5.1968E−03 | 3.4664E−02 | −6.0666E−02 | 5.6680E−02 | −2.4407E−02 | 3.1586E−03 |
| S7 | −4.6323E−03 | −1.2040E−03 | −1.1774E−02 | 2.1946E−02 | −2.3237E−02 | 1.1911E−02 | −2.2606E−03 |
| S8 | −5.1525E−02 | −1.3998E−02 | 2.6668E−02 | −3.4525E−02 | 2.4199E−02 | −9.4823E−03 | 1.6027E−03 |
| S9 | −4.4482E−02 | −3.7311E−02 | 3.0240E−02 | −1.2464E−02 | 1.9373E−03 | 4.8806E−04 | −1.4490E−04 |
| S10 | −4.4489E−02 | −1.4406E−02 | 1.7007E−02 | −7.8194E−03 | 1.9675E−03 | −2.0139E−04 | 8.3342E−07 |
| S11 | −8.9316E−02 | 6.4916E−02 | −3.0983E−02 | 9.5321E−03 | −1.8063E−03 | 1.9432E−04 | −9.2837E−06 |
| S12 | −1.6196E−01 | 7.1046E−02 | −2.0240E−02 | 2.8291E−03 | 8.0617E−05 | −6.9191E−05 | 5.4863E−06 |
| S13 | −6.6804E−02 | 4.8363E−03 | 3.0981E−03 | −1.5377E−03 | 3.1949E−04 | −3.2155E−05 | 1.2818E−06 |
| S14 | 3.6850E−02 | −3.3717E−02 | 1.3538E−02 | −2.7359E−03 | 2.8438E−04 | −1.3295E−05 | 1.5055E−07 |
| S15 | −1.3267E−01 | 3.7977E−03 | 1.0095E−02 | −3.2000E−03 | 4.5146E−04 | −3.1343E−05 | 8.5975E−07 |
| S16 | −1.6624E−01 | 4.7672E−02 | −7.6583E−03 | 7.0038E−04 | −3.4636E−05 | 7.7946E−07 | −3.8510E−09 |
| S17 | −5.2463E−02 | 2.8615E−02 | −6.1444E−03 | 6.9646E−04 | −4.3502E−05 | 1.4160E−06 | −1.8795E−08 |
| S18 | −3.1351E−02 | 7.4008E−03 | −1.0791E−03 | 9.3281E−05 | −4.7933E−06 | 1.3608E−07 | −1.6475E−09 |

Figure 12A:
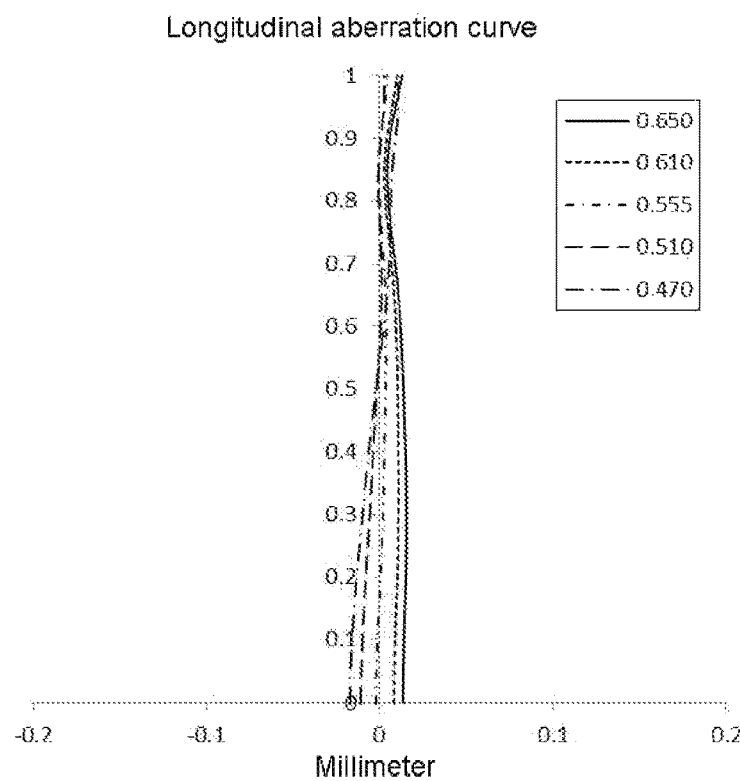
FIGS. 12A to 12D show a longitudinal aberration curve, an astigmatism curve, a distortion curve and a lateral color curve of an optical imaging lens assembly according to embodiment 6 respectively.
Figure 12B:
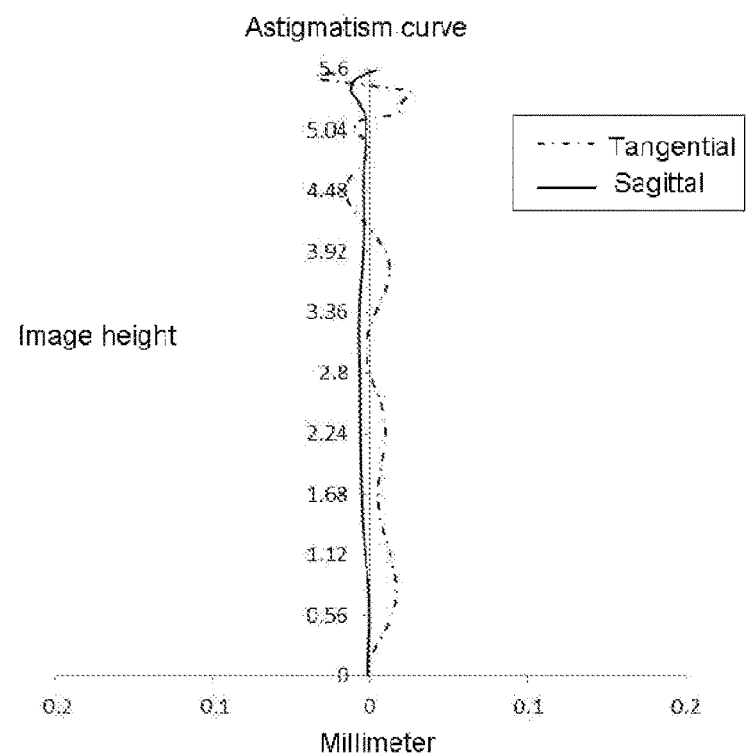
Figure 12C:
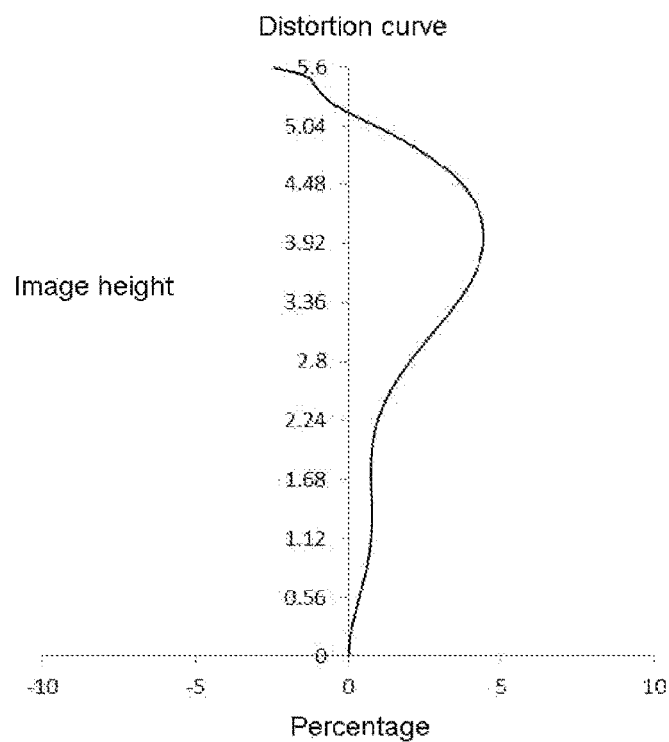
Figure 12D:
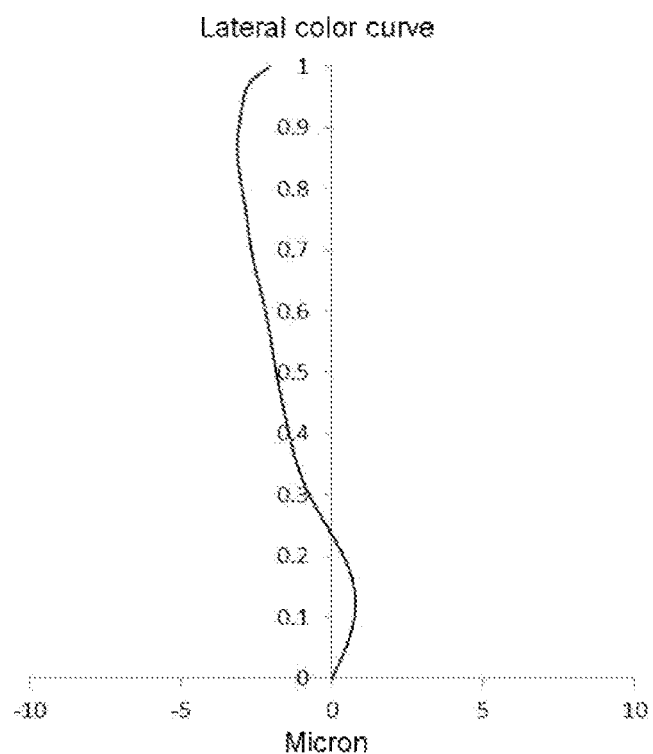

FIG. 12A shows a longitudinal aberration curve of the optical imaging lens assembly according to embodiment 6 to represent deviations of a convergence focal point after light with different wavelengths passes through the lens assembly. FIG. 12B shows an astigmatism curve of the optical imaging lens assembly according to embodiment 6 to represent a tangential image surface curvature and a sagittal image surface curvature. FIG. 12C shows a distortion curve of the optical imaging lens assembly according to embodiment 6 to represent distortion values corresponding to different image heights. FIG. 12D shows a lateral color curve of the optical imaging lens assembly according to embodiment 6 to represent deviations of different image heights on the imaging surface after the light passes through the lens assembly. According to FIGS. 12A to 12D, it can be seen that the optical imaging lens assembly provided in embodiment 6 may achieve high imaging quality.

Embodiment 7

Figure 13:
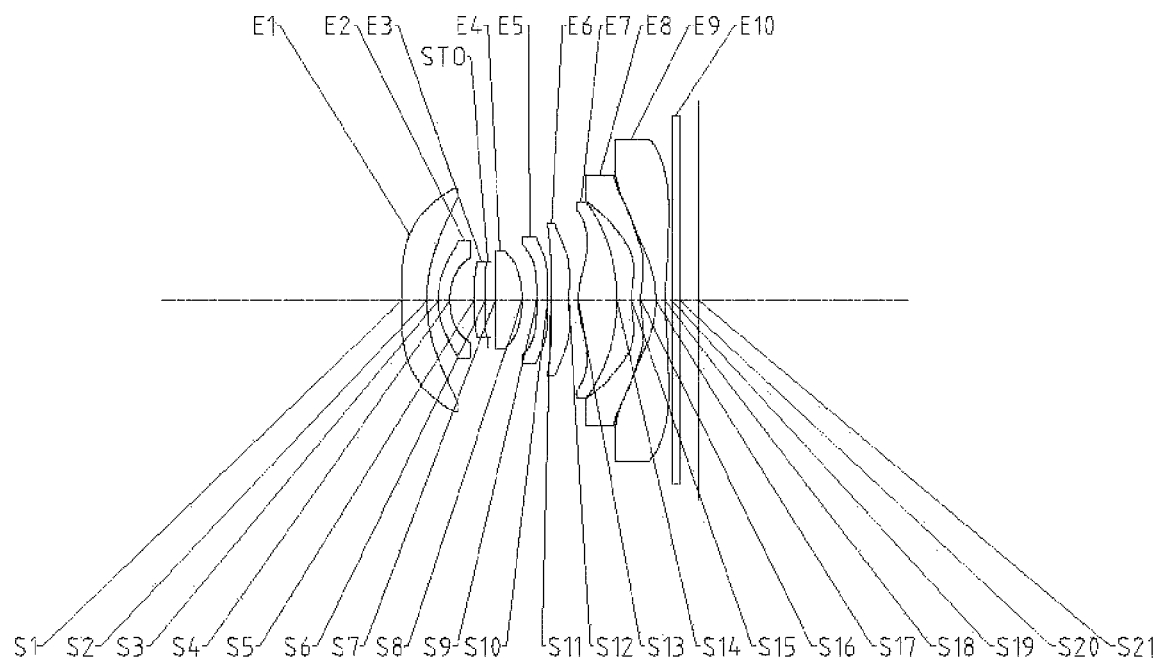
FIG. 13 shows a structure diagram of an optical imaging lens assembly according to embodiment 7 of the disclosure.

An optical imaging lens assembly according to embodiment 7 of the disclosure is described below with reference to FIGS. 13 to 14D. FIG. 13 shows a structure diagram of an optical imaging lens assembly according to embodiment 7 of the disclosure.

As shown in FIG. 13, the optical imaging lens assembly sequentially includes, from an object side to an image side, a first lens E1, a second lens E2, a third lens E3, a diaphragm STO, a fourth lens E4, a fifth lens E5, a sixth lens E6, a seventh lens E7, an eighth lens E8, a ninth lens E9, an optical filter E10, and an imaging surface S21.

The first lens E1 has a negative refractive power, an object-side surface S1 thereof is a concave surface, while an image-side surface S2 is a concave surface. The second lens E2 has a positive refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a convex surface. The fifth lens E5 has a negative refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. The seventh lens E7 has a positive refractive power, an object-side surface S13 thereof is a convex surface, while an image-side surface S14 is a convex surface. The eighth lens E8 has a negative refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

In the example, a total effective focal length f of the optical imaging lens assembly is 3.29 mm. TTL is a total length of the optical imaging lens assembly, and TTL is 8.30 mm. ImgH is a half of a diagonal length of an effective pixel region on the imaging surface S21 of the optical imaging lens assembly, and ImgH is 5.59 mm. FOV is a maximum field of view of the optical imaging lens assembly, and FOV is 119.9°.

Table 13 shows a basic parameter table of the optical imaging lens assembly of embodiment 7, and units of the curvature radius, the thickness/distance and the focal length are all millimeter (mm). Table 14 shows high-order coefficients that can be used for each asphericaspheric mirror surface in embodiment 7. A surface type of each asphericaspheric surface may be defined by the formula (1) given in embodiment 1.

TABLE 13

| | | | | Material | | | |
|---|---|---|---|---|---|---|---|
| Surface number | Surface type | Curvature radius | Thickness/ distance | Refractive index | Abbe number | Focal length | Conic coefficient |
| OBJ | Spherical | Infinite | Infinite | | | | |
| S1 | Aspheric | −417.5149 | 0.7028 | 1.57 | 37.3 | −8.20 | 0.0000 |
| S2 | Aspheric | 4.7327 | 0.3101 | | | | 0.0000 |

TABLE 13-continued

| Surface number | Surface type | Curvature radius | Thickness/ distance | Material Refractive index | Abbe number | Focal length | Conic coefficient |
|---|---|---|---|---|---|---|---|
| S3 | Aspheric | 1.9645 | 0.3265 | 1.67 | 19.2 | 138.11 | 0.0000 |
| S4 | Aspheric | 1.8719 | 0.6675 | | | | 0.0000 |
| S5 | Aspheric | 8.3413 | 0.3303 | 1.54 | 56.1 | 15.82 | 0.0000 |
| S6 | Aspheric | 239.4269 | 0.0665 | | | | 0.0000 |
| STO | Spherical | Infinite | 0.1984 | | | | |
| S7 | Aspheric | 19.4062 | 0.7595 | 1.54 | 56.1 | 5.32 | 0.0000 |
| S8 | Aspheric | −3.3649 | 0.4144 | | | | 0.0000 |
| S9 | Aspheric | −25.1106 | 0.2971 | 1.67 | 19.2 | −58.67 | 0.0000 |
| S10 | Aspheric | −68.4932 | 0.0897 | | | | 0.0000 |
| S11 | Aspheric | 12.0735 | 0.5008 | 1.54 | 56.1 | −13.99 | 0.0000 |
| S12 | Aspheric | 4.6090 | 0.2715 | | | | 0.0000 |
| S13 | Aspheric | 2.2240 | 1.0796 | 1.54/ | 56.1 | 2.83 | −1.2179 |
| S14 | Aspheric | −4.2165 | 0.4079 | | | | 0.0000 |
| S15 | Aspheric | 2.8291 | 0.2500 | 1.67 | 19.2 | −36.45 | −0.7003 |
| S16 | Aspheric | 2.4477 | 0.4287 | | | | −0.9711 |
| S17 | Aspheric | −3.4562 | 0.2500 | 1.67 | 19.2 | −3.25 | −1.0654 |
| S18 | Aspheric | 6.2604 | 0.1987 | | | | 0.0000 |
| S19 | Spherical | Infinite | 0.2100 | 1.52 | 64.2 | | |
| S20 | Spherical | Infinite | 0.5400 | | | | |
| S21 | Spherical | Infinite | | | | | |

TABLE 14

| Surface number | A4 | A6 | A8 | A10 | A12 | A14 | A16 |
|---|---|---|---|---|---|---|---|
| S1 | 3.5280E−02 | −9.1036E−03 | 2.3436E−03 | −4.1362E−04 | 4.6889E−05 | −2.9599E−06 | 7.7607E−08 |
| S2 | 7.5707E−03 | −3.7769E−03 | 1.3551E−03 | −3.4255E−04 | 4.6988E−05 | −3.2243E−06 | 8.7723E−08 |
| S3 | −4.9675E−02 | 1.1343E−02 | −4.2974E−03 | 5.6981E−03 | −4.6445E−03 | 1.3609E−03 | −1.3835E−04 |
| S4 | 3.4585E−03 | 7.5827E−02 | −1.5329E−01 | 2.9689E−01 | −2.9559E−01 | 1.5727E−01 | −3.3473E−02 |
| S5 | 1.1413E−02 | 2.2733E−02 | −4.8154E−02 | 9.2768E−02 | −1.0151E−01 | 5.9570E−02 | −1.5400E−02 |
| S6 | 1.1565E−02 | −1.6061E−02 | 7.6287E−02 | −1.4532E−01 | 1.5275E−01 | −8.0596E−02 | 1.6267E−02 |
| S7 | −2.2832E−03 | −1.3287E−03 | −7.5666E−03 | 1.3431E−02 | −1.4281E−02 | 7.2766E−03 | −1.3254E−03 |
| S8 | −4.8138E−02 | −1.5165E−02 | 2.8072E−02 | −3.7591E−02 | 2.7392E−02 | −1.0941E−02 | 1.8692E−03 |
| S9 | −4.5040E−02 | −4.5453E−02 | 2.1726E−02 | 1.0956E−02 | −1.6871E−02 | 7.2082E−03 | −1.0362E−03 |
| S10 | −1.8710E−02 | −5.5615E−02 | 4.7461E−02 | −1.7424E−02 | 2.0686E−03 | 3.8858E−04 | −8.9637E−05 |
| S11 | −6.9016E−02 | 4.2649E−02 | −1.6326E−02 | 3.5649E−03 | −3.5643E−04 | −5.3950E−07 | 1.9087E−06 |
| S12 | −1.7903E−01 | 9.2444E−02 | −3.4932E−02 | 7.7005E−03 | −5.8234E−04 | −6.2160E−05 | 9.3630E−06 |
| S13 | −7.2916E−02 | 1.4661E−02 | −1.3443E−03 | −7.6580E−04 | 3.0272E−04 | −4.1409E−05 | 2.0039E−06 |
| S14 | 4.0128E−02 | −3.5409E−02 | 1.5626E−02 | −3.8504E−03 | 5.4496E−04 | −4.1457E−05 | 1.3068E−06 |
| S15 | −1.3563E−01 | 1.2938E−02 | 1.1984E−03 | −3.6409E−03 | 4.9774E−04 | −3.3243E−05 | 8.6290E−07 |
| S16 | −1.7050E−01 | 4.9563E−02 | −8.0656E−03 | 7.4692E−04 | −3.7214E−05 | 8.3465E−07 | −3.9940E−09 |
| S17 | −5.5100E−02 | 3.1788E−02 | −7.1534E−03 | 8.3929E−04 | −5.3326E−05 | 1.7224E−06 | −2.1851E−08 |
| S18 | −3.5421E−02 | 8.9932E−03 | −1.3467E−03 | 1.1772E−04 | −6.0465E−06 | 1.6982E−07 | −2O198E−09 |

Figure 14A:
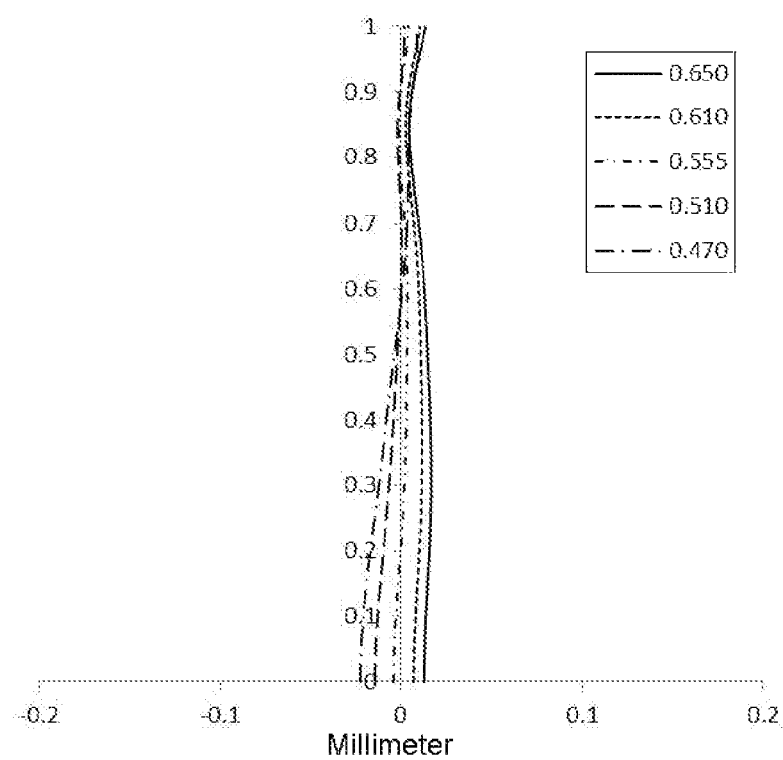
FIGS. 14A to 14D show a longitudinal aberration curve, an astigmatism curve, a distortion curve and a lateral color curve of an optical imaging lens assembly according to embodiment 7 respectively.
Figure 14B:
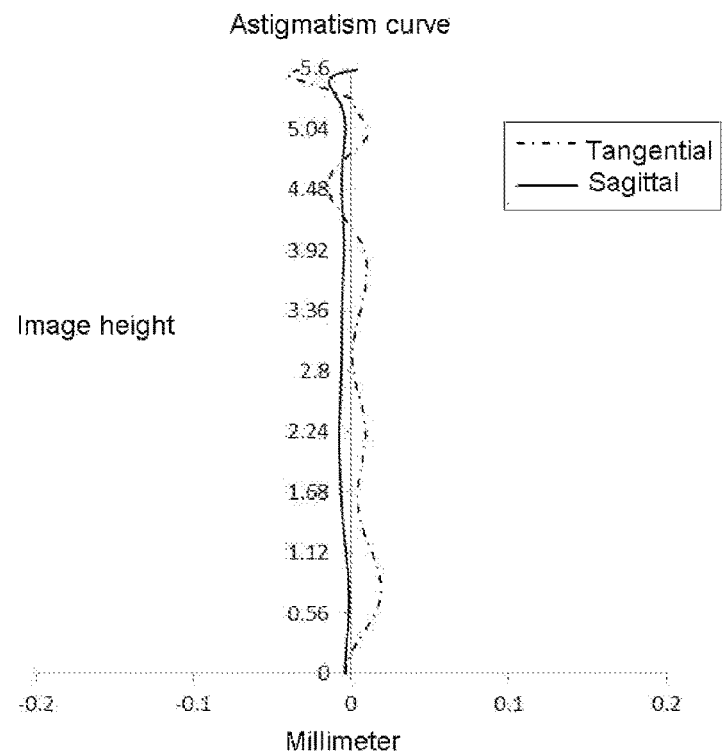
Figure 14C:
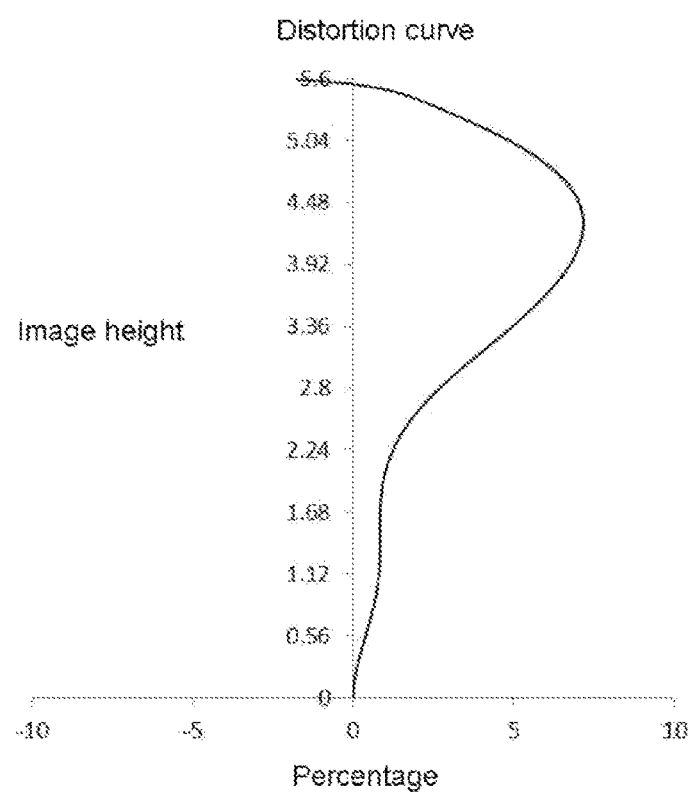
Figure 14D:
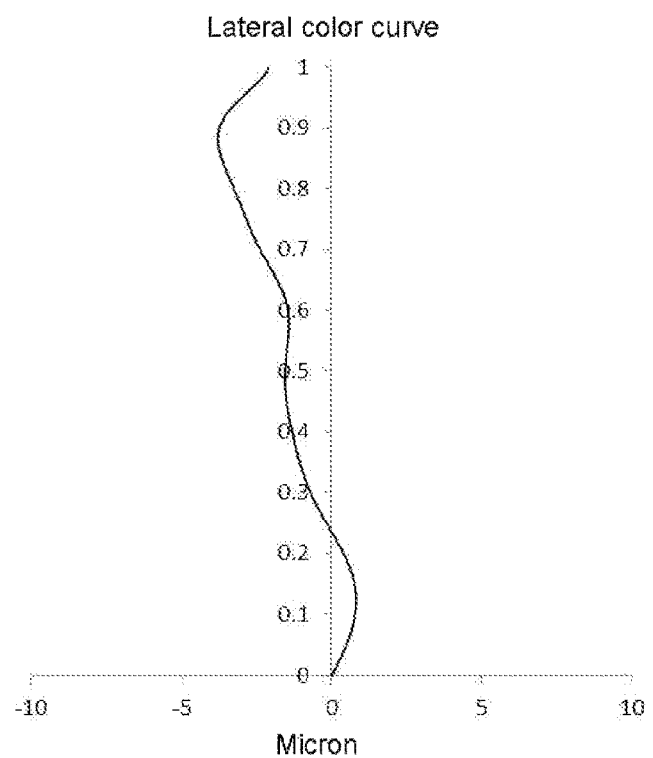

FIG. 14A shows a longitudinal aberration curve of the optical imaging lens assembly according to embodiment 7 to represent deviations of a convergence focal point after light with different wavelengths passes through the lens assembly. FIG. 14B shows an astigmatism curve of the optical imaging lens assembly according to embodiment 7 to represent a tangential image surface curvature and a sagittal image surface curvature. FIG. 14C shows a distortion curve of the optical imaging lens assembly according to embodiment 7 to represent distortion values corresponding to different image heights. FIG. 14D shows a lateral color curve of the optical imaging lens assembly according to embodiment 7 to represent deviations of different image heights on the imaging surface after the light passes through the lens assembly. According to FIGS. 14A to 14D, it can be seen that the optical imaging lens assembly provided in embodiment 7 may achieve high imaging quality.

Embodiment 8

Figure 15:
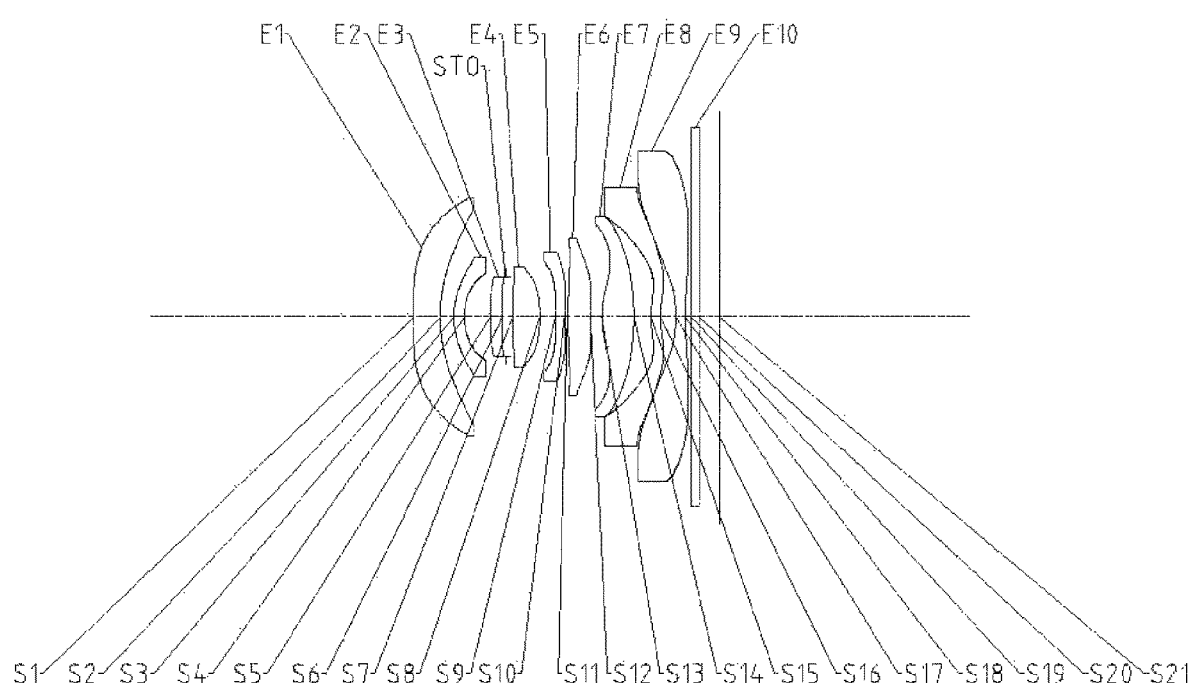
FIG. 15 shows a structure diagram of an optical imaging lens assembly according to embodiment 8 of the disclosure.

An optical imaging lens assembly according to embodiment 8 of the disclosure is described below with reference to FIGS. 15 to 16D. FIG. 15 is a structure diagram of an optical imaging lens assembly according to embodiment 8 of the disclosure.

As shown in FIG. 15, the optical imaging lens assembly sequentially includes, from an object side to an image side, a first lens E1, a second lens E2, a third lens E3, a diaphragm STO, a fourth lens E4, a fifth lens E5, a sixth lens E6, a seventh lens E7, an eighth lens E8, a ninth lens E9, an optical filter E10, and an imaging surface S21.

The first lens E1 has a negative refractive power, an object-side surface S1 thereof is a concave surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a convex surface. The fifth lens E5 has a negative refractive power, an object-side surface S9 thereof is a convex surface, while an image-side surface S10 is a concave surface. The sixth lens E6 has a positive refractive power, an object-side surface S11 thereof is a convex surface, while an image-side surface S12 is a concave surface. The seventh lens E7 has a positive refractive power, an object-side surface S13 thereof is a convex surface, while an image-side surface S14 is a convex surface. The eighth lens E8 has a negative refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

In the example, a total effective focal length f of the optical imaging lens assembly is 3.23 mm. TTL is a total length of the optical imaging lens assembly, and TTL is 8.30 mm. ImgH is a half of a diagonal length of an effective pixel region on the imaging surface S21 of the optical imaging lens assembly, and ImgH is 5.59 mm. FOV is a maximum field of view of the optical imaging lens assembly, and FOV is 119.9°.

Table 15 shows a basic parameter table of the optical imaging lens assembly of embodiment 8, and units of the curvature radius, the thickness/distance and the focal length are all millimeter (mm). Table 16 shows high-order coefficients that can be used for each asphericaspheric mirror surface in embodiment 8. A surface type of each asphericaspheric surface may be defined by the formula (1) given in embodiment 1.

TABLE 15

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | −166.8592 | 0.7278 | 1.57 | 37.3 | −8.13 | 0.0000 |
| S2 | Aspheric | 4.7771 | 0.3587 | | | | 0.0000 |
| S3 | Aspheric | 1.9666 | 0.2924 | 1.67 | 19.2 | −817.71 | 0.0000 |
| S4 | Aspheric | 1.8420 | 0.6882 | | | | 0.0000 |
| S5 | Aspheric | 7.7556 | 0.3331 | 1.54 | 56.1 | 16.07 | 0.0000 |
| S6 | Aspheric | 65.8541 | 0.0817 | | | | 0.0000 |
| STO | Spherical | Infinite | 0.2001 | | | | |
| S7 | Aspheric | 14.5364 | 0.7377 | 1.54 | 56.1 | 5.59 | 0.0000 |
| S8 | Aspheric | −3.7951 | 0.4185 | | | | 0.0000 |
| S9 | Aspheric | 72.4442 | 0.2506 | 1.67 | 19.2 | −20.43 | 0.0000 |
| S10 | Aspheric | 11.6078 | 0.0692 | | | | 0.0000 |
| S11 | Aspheric | 5.0141 | 0.6453 | 1.54 | 56.1 | 58.14 | 0.0000 |
| S12 | Aspheric | 5.6841 | 0.3103 | | | | 0.0000 |
| S13 | Aspheric | 2.4030 | 0.8712 | 1.54 | 56.1 | 3.20 | −1.2805 |
| S14 | Aspheric | −5.6070 | 0.4576 | | | | 0.0000 |
| S15 | Aspheric | 2.7092 | 0.2500 | 1.67 | 19.2 | −37.64 | −0.7285 |
| S16 | Aspheric | 2.3578 | 0.4259 | | | | −0.9797 |
| S17 | Aspheric | −3.6248 | 0.2500 | 1.67 | 19.2 | −3.39 | −1.1955 |
| S18 | Aspheric | 6.4566 | 0.1816 | | | | 0.0000 |
| S19 | Spherical | Infinite | 0.2100 | 1.52 | 64.2 | | |
| S20 | Spherical | Infinite | 0.5400 | | | | |
| S21 | Spherical | Infinite | | | | | |

TABLE 16

| Surface number | A4 | A6 | A8 | A10 | A12 | A14 | A16 |
|---|---|---|---|---|---|---|---|
| S1 | 3.2887E−02 | −8.1057E−03 | 1.9689E−03 | −3.2808E−04 | 3.4993E−05 | −2.0727E−06 | 5.0988E−08 |
| S2 | 6.8298E−03 | −3.3551E−03 | 1.1653E−03 | −2.8075E−04 | 3.6527E−05 | −2.3741E−06 | 6.1124E−08 |
| S3 | −4.9360E−02 | 1.3194E−02 | −4.7723E−03 | 6.5624E−03 | −5.8427E−03 | 1.8376E−03 | −1.9798E−04 |
| S4 | 2.7494E−03 | 7.7009E−02 | −1.4637E−01 | 2.8106E−01 | −2.7727E−01 | 1.4631E−01 | −3.1197E−02 |
| S5 | 1.4534E−02 | 1.9423E−02 | −3.2832E−02 | 6.1371E−02 | −6.4720E−02 | 3.7486E−02 | −1.0001E−02 |
| S6 | 1.4074E−02 | −1.5906E−02 | 7.4009E−02 | −1.3650E−01 | 1.4196E−01 | −7.3988E−02 | 1.4677E−02 |
| S7 | −1.5716E−03 | −4.4849E−03 | −1.8253E−03 | 5.3154E−03 | −7.3188E−03 | 4.2884E−03 | −8.0774E−04 |
| S8 | −4.6319E−02 | −2.7720E−02 | 4.2824E−02 | −4.9429E−02 | 3.4033E−02 | −1.3065E−02 | 2.1709E−03 |
| S9 | −1.9790E−02 | −7.7005E−02 | 4.7170E−02 | −1.3435E−02 | 4.8381E−04 | 1.1691E−03 | −2.5914E−04 |
| S10 | −3.3352E−02 | −3.4336E−02 | 2.3818E−02 | −5.2905E−03 | −3.1841E−04 | 3.9180E−04 | −5.5936E−05 |
| S11 | −1.0035E−01 | 7.0656E−02 | −3.3903E−02 | 1.0610E−02 | −2.0972E−03 | 2.3964E−04 | −1.2304E−05 |
| S12 | −1.4302E−01 | 5.0063E−02 | −6.1931E−02 | −3.2512E−03 | 1.7220E−03 | −3.1020E−04 | 1.9953E−05 |
| S13 | −4.6614E−02 | −8.1749E−03 | 8.5273E−03 | −3.4739E−03 | 7.6493E−04 | −8.5132E−05 | 3.7224E−06 |
| S14 | 4.0815E−02 | −3.5970E−02 | 1.3428E−02 | −2.6025E−03 | 2.6488E−04 | −1.2356E−05 | 1.3832E−07 |
| S15 | −1.4409E−01 | 6.1190E−03 | 9.7907E−03 | −2.9294E−03 | 3.5931E−04 | −1.9273E−05 | 3.0664E−07 |
| S16 | −1.7013E−01 | 4.9421E−02 | −8.0638E−03 | 7.5338E−04 | −3.8520E−05 | 9.4063E−07 | −7.0943E−09 |
| S17 | −5.1692E−02 | 2.9245E−02 | −6.4243E−03 | 7.3772E−04 | −4.6104E−05 | 1.4778E−06 | −1.8922E−08 |
| S18 | −3.6142E−02 | 9.3089E−03 | −1.4039E−03 | 1.2331E−04 | −6.3806E−06 | 1.8174E−07 | −2.2084E−09 |

Figure 16A:
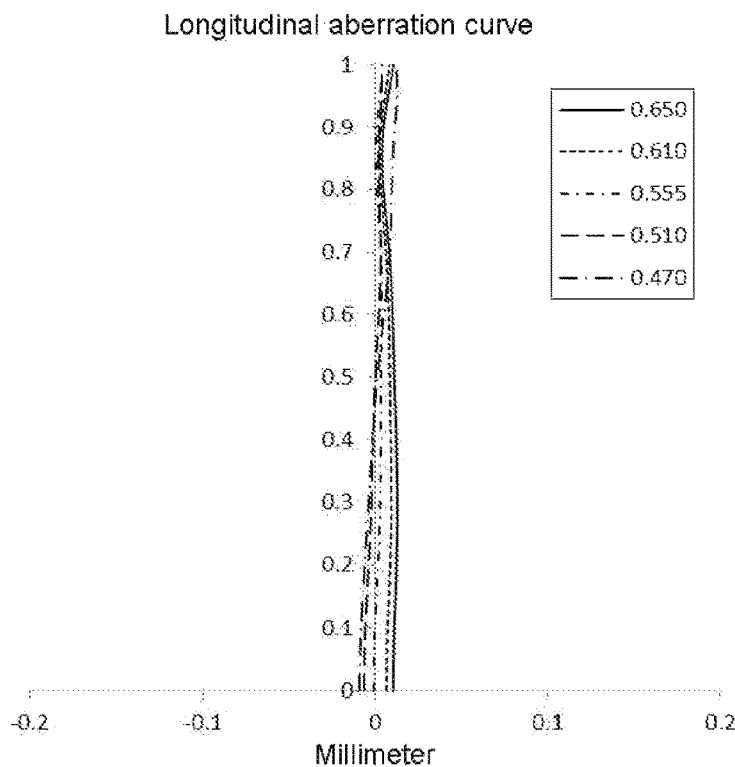
FIGS. 16A to 16D show a longitudinal aberration curve, an astigmatism curve, a distortion curve and a lateral color curve of an optical imaging lens assembly according to embodiment 8 respectively.
Figure 16B:
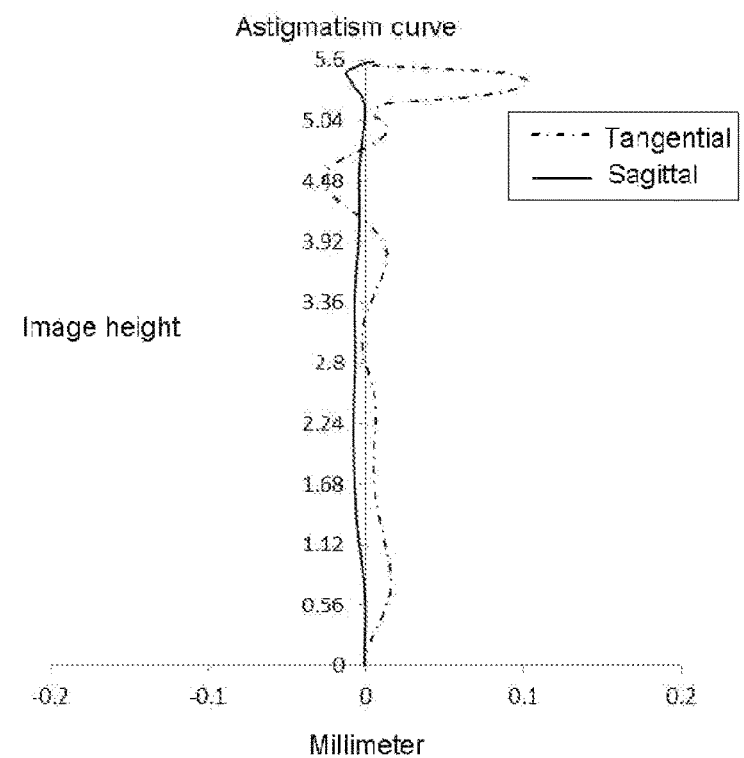
Figure 16C:
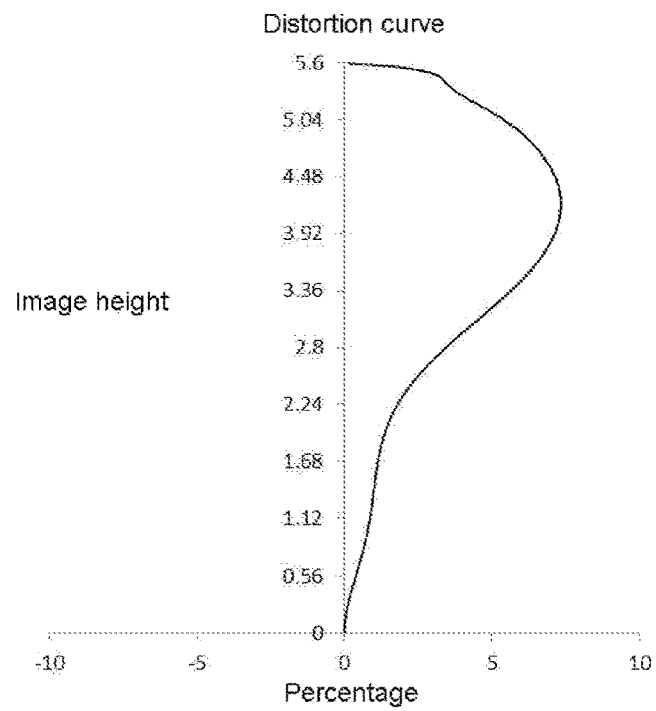
Figure 16D:
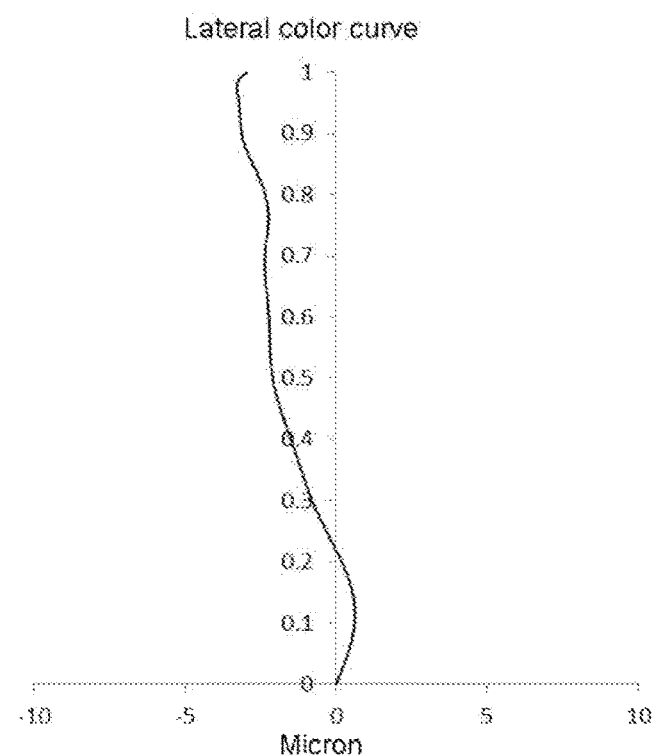

FIG. 16A shows a longitudinal aberration curve of the optical imaging lens assembly according to embodiment 8 to represent deviations of a convergence focal point after light with different wavelengths passes through the lens assembly. FIG. 16B shows an astigmatism curve of the optical imaging lens assembly according to embodiment 8 to represent a tangential image surface curvature and a sagittal image surface curvature. FIG. 16C shows a distortion curve of the optical imaging lens assembly according to embodiment 8 to represent distortion values corresponding to different image heights. FIG. 16D shows a lateral color curve of the optical imaging lens assembly according to embodiment 8 to represent deviations of different image heights on the imaging surface after the light passes through the lens assembly. According to FIGS. 16A to 16D, it can be seen that the optical imaging lens assembly provided in embodiment 8 may achieve high imaging quality.

From the above, embodiment 1 to embodiment 8 meet a relationship shown in Table 17 respectively.

TABLE 17

| Conditional expression | embodiment | | | | | | | |
| --- | --- | --- | --- | --- | --- | --- | --- | --- |
|  | 1 | 2 | 3 | 4 | 5 | 6 | 7 | 8 |
| ImgH/f | 1.69 | 1.68 | 1.70 | 1.71 | 1.75 | 1.69 | 1.70 | 1.73 |
| f1/f9 | 2.44 | 2.42 | 2.34 | 2.51 | 2.37 | 2.33 | 2.52 | 2.40 |
| f3/(f4 + f7) | 1.64 | 1.78 | 1.78 | 1.67 | 1.72 | 1.36 | 1.94 | 1.83 |
| R2/(R3 + R4) | 1.25 | 1.20 | 1.20 | 1.27 | 1.24 | 1.22 | 1.23 | 1.25 |
| R11/R12 | 1.90 | 1.47 | 1.45 | 1.42 | 1.56 | 1.45 | 2.62 | 0.88 |
| (R17 − R18)/(R13 + R14) | 5.89 | 5.71 | 5.32 | 4.80 | 3.51 | 5.04 | 4.88 | 3.15 |
| R15/R16 | 1.22 | 1.12 | 1.11 | 1.13 | 1.14 | 1.17 | 1.16 | 1.15 |
| (T78 + T89)/T23 | 1.16 | 1.27 | 1.29 | 1.29 | 1.20 | 1.31 | 1.25 | 1.28 |
| DT11/(DT31 + DT32) | 1.45 | 1.39 | 1.40 | 1.45 | 1.58 | 1.38 | 1.48 | 1.52 |
| DT92/(DT31 + DT32) | 2.09 | 2.08 | 2.08 | 2.08 | 2.10 | 2.09 | 2.13 | 2.12 |
| f56/(f12 + f89) | 1.59 | 1.23 | 1.22 | 1.26 | 0.96 | 1.37 | 1.00 | 2.76 |
| f34/(CT3 + CT4) | 3.99 | 4.09 | 4.03 | 3.90 | 3.77 | 4.16 | 3.82 | 4.04 |
| CT7/ET7 | 4.06 | 4.11 | 4.04 | 3.80 | 3.62 | 3.85 | 4.31 | 3.47 |
| (ET4 + ET8)/ET9 | 1.31 | 1.06 | 1.07 | 1.11 | 1.24 | 1.35 | 1.10 | 1.44 |

The disclosure also provides an imaging device, of which an electronic photosensitive element may be a CCD or a CMOS. The imaging device may be an independent imaging device such as a digital camera, or may be an imaging module integrated into a mobile electronic device such as a mobile phone. The imaging device is provided with the above-mentioned optical imaging lens assembly.

The above description is only description about the preferred embodiments of the disclosure and adopted technical principles. It is understood by those skilled in the art that the scope of invention involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens assembly, sequentially comprising, from an object side to an image side along an optical axis:
   a first lens with a negative refractive power,
   a second lens with a refractive power,
   a third lens with a refractive power,
   a fourth lens with a positive refractive power,
   a fifth lens with a refractive power,
   a sixth lens with a refractive power,
   a seventh lens with a positive refractive power,
   an eighth lens with a negative refractive power, and
   a ninth lens with a negative refractive power,
   wherein ImgH is a half of a diagonal length of an effective pixel region on an imaging surface of the optical imaging lens assembly, ImgH and a total effective focal length f of the optical imaging lens assembly meet $1.2<ImgH/f<2.2$; and
   there is a spacing distance between any two adjacent lenses in the first lens to the ninth lens;
   a combined focal length f56 of the fifth lens and the sixth lens, a combined focal length f12 of the first lens and the second lens and a combined focal length f89 of the eighth lens and the ninth lens meet $0.8<f56/(f12+f89)<2.9$.

2. The optical imaging lens assembly according to claim 1, wherein an effective focal length f1 of the first lens and an effective focal length f9 of the ninth lens meet $2.2<f1/f9<2.7$.

3. The optical imaging lens assembly according to claim 1, wherein an effective focal length f3 of the third lens, an effective focal length f4 of the fourth lens and an effective focal length f7 of the seventh lens meet $1.2<f3/(f4+f7)<2.1$.

4. The optical imaging lens assembly according to claim 1, wherein a curvature radius R2 of an image-side surface of the first lens, a curvature radius R3 of an object-side surface of the second lens and a curvature radius R4 of an image-side surface of the second lens meet $1.0<R2/(R3+R4)<1.5$.

5. The optical imaging lens assembly according to claim 1, wherein a curvature radius R11 of an object-side surface of the sixth lens and a curvature radius R12 of an image-side surface of the sixth lens meet $0.7<R11/R12<2.7$.

6. The optical imaging lens assembly according to claim 1, wherein a curvature radius R17 of an object-side surface of the ninth lens, a curvature radius R18 of an image-side surface of the ninth lens, a curvature radius R13 of an object-side surface of the seventh lens and a curvature radius R14 of an image-side surface of the seventh lens meet $3.0<(R17-R18)/(R13+R14)<6.0$.

7. The optical imaging lens assembly according to claim 1, wherein a curvature radius R15 of an object-side surface of the eighth lens and a curvature radius R16 of an image-side surface of the eighth lens meet $1.0<R15/R16<1.5$.

8. The optical imaging lens assembly according to claim 1, wherein a spacing distance T78 of the seventh lens and the eighth lens on the optical axis, a spacing distance T89 of the eighth lens and the ninth lens on the optical axis and a spacing distance T23 of the second lens and the third lens on the optical axis meet $1.0<(T78+T89)/T23<1.5$.

9. The optical imaging lens assembly according to claim 1, wherein an effective radius DT11 of an object-side surface of the first lens, an effective radius DT31 of an object-side surface of the third lens and an effective radius DT32 of an image-side surface of the third lens meet $1.2<DT11/(DT31+DT32)<1.7$.

10. The optical imaging lens assembly according to claim 1, wherein an effective radius DT92 of an image-side surface of the ninth lens, an effective radius DT31 of an object-side surface of the third lens and an effective radius DT32 of an image-side surface of the third lens meet $1.8<DT92/(DT31+DT32)<2.3$.

11. The optical imaging lens assembly according to claim 1, wherein a combined focal length f34 of the third lens and the fourth lens, a center thickness CT3 of the third lens on the optical axis and a center thickness CT4 of the fourth lens on the optical axis meet $3.5<f34/(CT3+CT4)<4.5$.

12. The optical imaging lens assembly according to claim 1, wherein a center thickness CT7 of the seventh lens on the optical axis and an edge thickness ET7 of the seventh lens meet $3.3<CT7/ET7<4.4$.

13. The optical imaging lens assembly according to claim 1, wherein an edge thickness ET4 of the fourth lens, an edge thickness ET8 of the eighth lens and an edge thickness ET9 of the ninth lens meet $1.0<(ET4+ET8)/ET9<1.5$.

14. The optical imaging lens assembly according to claim 1, wherein at least three of the first lens to the ninth lens are plastic lenses.

15. The optical imaging lens assembly according to claim 1, wherein TTL is a distance from an object-side surface of the first lens to an imaging surface of the optical imaging lens assembly on the optical axis, and TTL meet TTL<10 mm.

16. An optical imaging lens assembly, sequentially comprising, from an object side to an image side along an optical axis:
a first lens with a negative refractive power,
a second lens with a refractive power,
a third lens with a refractive power,
a fourth lens with a positive refractive power,
a fifth lens with a refractive power,
a sixth lens with a refractive power,
a seventh lens with a positive refractive power,
an eighth lens with a negative refractive power, and
a ninth lens with a negative refractive power,
wherein an effective focal length f3 of the third lens, an effective focal length f4 of the fourth lens and an effective focal length f7 of the seventh lens meet $1.2<f3/(f4+f7)<2.1$; and
there is a spacing distance between any two adjacent lenses in the first lens to the ninth lens;
a combined focal length f56 of the fifth lens and the sixth lens, a combined focal length f12 of the first lens and the second lens and a combined focal length f89 of the eighth lens and the ninth lens meet $0.8<f56/(f12+f89)<2.9$.

17. The optical imaging lens assembly according to claim 16, wherein an effective focal length f1 of the first lens and an effective focal length f9 of the ninth lens meet $2.2<f1/f9<2.7$.

18. The optical imaging lens assembly according to claim 16, wherein a curvature radius R2 of an image-side surface of the first lens, a curvature radius R3 of an object-side surface of the second lens and a curvature radius R4 of an image-side surface of the second lens meet $1.0<R2/(R3+R4)<1.5$.

19. The optical imaging lens assembly according to claim 16, wherein a curvature radius R11 of an object-side surface of the sixth lens and a curvature radius R12 of an image-side surface of the sixth lens meet $0.7<R11/R12<2.7$.

* * * * *